US012739068B2

(12) United States Patent
Gupta et al.

(10) Patent No.: US 12,739,068 B2
(45) Date of Patent: Sep. 15, 2026

(54) LIFE CYCLE MANAGEMENT OF A RECEIVER WITH AN ARTIFICIAL INTELLIGENCE RECEIVER MODULE

(71) Applicant: VIAVI Solutions Inc., Chandler, AZ (US)

(72) Inventors: Ankit Gupta, Welwyn Garden City (GB); Onur Dizdar, London (GB); Yun Chen, Stevenage (GB); Chi-Ming Leung, Hardwick (GB); Stephen Wang, London (GB); Zunaira Babar, Hitchin (GB)

(73) Assignee: VIAVI Solutions Inc., Chandler, AZ (US)

( * ) Notice: Subject to any disclaimer, the term of this patent is extended or adjusted under 35 U.S.C. 154(b) by 116 days.

(21) Appl. No.: 18/895,124

(22) Filed: Sep. 24, 2024

(65) Prior Publication Data

US 2026/0088945 A1 Mar. 26, 2026

(51) Int. Cl.
*H04L 1/20* (2006.01)
*G06N 3/042* (2023.01)
(Continued)

(52) U.S. Cl.
CPC ............... *H04L 1/20* (2013.01); *G06N 3/042* (2023.01); *G06N 3/08* (2013.01); *H04L 1/0039* (2013.01);
(Continued)

(58) Field of Classification Search
CPC ....... H04L 1/20; H04L 1/0039; H04L 1/0618; H04L 2012/5686; H04L 2025/03458; H04L 45/08; G06N 3/08; G06N 3/042
(Continued)

(56) References Cited

U.S. PATENT DOCUMENTS

2022/0114436 A1* 4/2022 Gopalan ................ G06N 3/044
2023/0079521 A1* 3/2023 Jeon ..................... G06N 3/0464 375/262

(Continued)

FOREIGN PATENT DOCUMENTS

WO 2024025445 A1 2/2024

OTHER PUBLICATIONS

N. Shlezinger, et al.; "ViterbiNet: A Deep Learning Based Viterbi Algorithm for Symbol Detection"; IEEE Transactions On Wireless Communications; vol. 19, No. 5; pp. 3319-3331; May 2020.

(Continued)

*Primary Examiner* — John J Tabone, Jr.
(74) *Attorney, Agent, or Firm* — Harrity & Harrity, LLP

(57) ABSTRACT

A management system may receive a wireless signal transmitted to a receiver. The management system may determine, based on the wireless signal or a set of decoded bits associated with the wireless signal that were determined using an artificial intelligence (AI) receiver module of the receiver, whether a cyclic redundancy check (CRC) associated with the wireless signal is passed. The management system may perform, based on determining whether the CRC associated with the wireless signal is passed, at least one of: a data storage operation associated with the wireless signal, a fallback operation associated with the wireless signal, or an online label recovery operation associated with the wireless signal. The management system may perform, based on determining whether the CRC associated with the wireless signal is passed, a model modification operation to update a neural network (NN) of the AI receiver module of the receiver.

20 Claims, 11 Drawing Sheets

(51) Int. Cl.

| | |
|---|---|
| ***G06N 3/08*** | (2023.01) |
| ***H04L 1/00*** | (2006.01) |
| ***H04L 1/06*** | (2006.01) |
| ***H04L 25/03*** | (2006.01) |
| ***H04L 45/02*** | (2022.01) |
| *H04L 12/70* | (2013.01) |

(52) U.S. Cl.
CPC ............ *H04L 1/0618* (2013.01); *H04L 45/08* (2013.01); *H04L 2012/5686* (2013.01); *H04L 2025/03458* (2013.01)

(58) Field of Classification Search
USPC ......................... 714/776, 799, 800, 819, 821

See application file for complete search history.

(56) References Cited

U.S. PATENT DOCUMENTS

| | | | | |
|---|---|---|---|---|
| 2023/0090593 | A1* | 3/2023 | Kim | H04L 1/00 370/252 |
| 2026/0088945 | A1* | 3/2026 | Gupta | H04L 1/20 |

OTHER PUBLICATIONS

S. Schibisch, et al.; "Online Label Recovery for Deep Learning-based Communication through Error Correcting Codes," 2018; pp. 1-5; ISWCS 2018 SS3; IEEE Xplore.

R. A. Finish, et al.; "Symbol-Level Online Channel Tracking for Deep Receivers," ICASSP 2022—2022 IEEE International Conference on Acoustics, Speech and Signal Processing (ICASSP), Singapore, Singapore, 2022, pp. 8897-8901, doi: 10.1109/ICASSP43922.2022.9747026.

Extended European Search Report for European Application No. EP251957015 dated May 6, 2026, 9 pages.

* cited by examiner

905 Receive pilotless wireless signal

910 Determine SNR value (see Fig. 10)

915 Check CRC

Pass

920 Perform data storage operation (see Fig. 5)

925 Reset fail counter, PNf = 0

Fail

930 Increment fail counter, PNf = PNf + 1

935 Save information associated with the pilotless wireless signal

940 Perform model modification operation (see Fig. 11)

1105

PNF > PTF

Yes

1110

Request transmission of pilot wireless signals

Receive pilot wireless signal

1115

1120

Pass

Check CRC

Fail

1130

Perform online label recovery operation (see Fig. 7)

Perform fallback operation (see Fig. 6)

1125

Perform model modification operation

1135

Perform model verification operation

1140

LIFE CYCLE MANAGEMENT OF A RECEIVER WITH AN ARTIFICIAL INTELLIGENCE RECEIVER MODULE

BACKGROUND

To communicate wirelessly, a transmitting device may convert a stream of bits into wireless signals (e.g., radio frequency (RF) signals). A receiving device may receive wireless signals from the transmitting device and convert the received wireless signals back into bits. The receiving device may use hard coding to map each data symbol (from the received wireless signals) to a '1' or a '0' or may use soft coding to map each data symbol (from the received wireless signals) to a log likelihood ratio (LLR) value.

SUMMARY

In some implementations, a management system includes one or more memories; and one or more processors, communicatively coupled to the one or more memories, configured to: receive a wireless signal transmitted to a receiver, wherein the wireless signal is one of a pilot wireless signal or a pilotless wireless signal; determine a signal-to-noise ratio (SNR) value associated with the wireless signal; determine, based on the wireless signal or a set of decoded bits associated with the wireless signal that were determined using an artificial intelligence (AI) receiver module of the receiver, whether a cyclic redundancy check (CRC) associated with the wireless signal is passed; perform, based on determining whether the CRC associated with the wireless signal is passed, a model modification operation to update a neural network (NN) of the AI receiver module of the receiver; and perform a model verification operation associated with the NN.

In some implementations, a management system includes one or more processors configured to: receive a wireless signal transmitted to a receiver; determine, based on the wireless signal or a set of decoded bits associated with the wireless signal that were determined using an AI receiver module of the receiver, whether a CRC associated with the wireless signal is passed; perform, based on determining whether the CRC associated with the wireless signal is passed, a model modification operation to update NN of the AI receiver module of the receiver; and perform a model verification operation associated with the NN.

In some implementations, a method includes receiving a wireless signal transmitted to a receiver, determining, based on the wireless signal or a set of decoded bits associated with the wireless signal that were determined using an AI receiver module of the receiver, whether a CRC associated with the wireless signal is passed; performing, based on determining whether the CRC associated with the wireless signal is passed, at least one of: a data storage operation associated with the wireless signal, a fallback operation, or an online label recovery operation; and performing, based on determining whether the CRC associated with the wireless signal is passed, a model modification operation to update an NN of the AI receiver module of the receiver.

DETAILED DESCRIPTION

Figure 1:
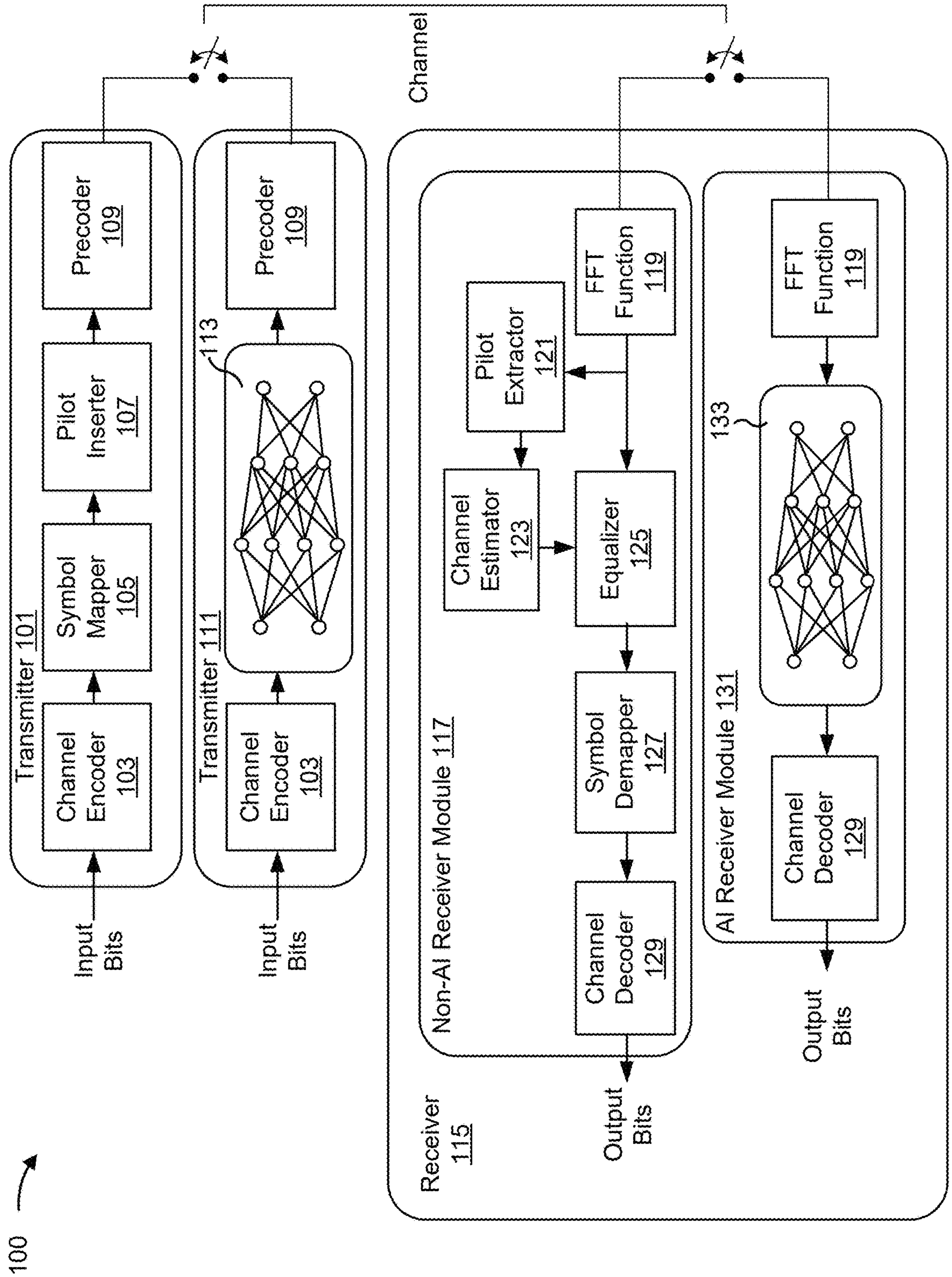
FIG. 1 is a diagram of an example implementation associated with life cycle management (LCM) of a receiver with an artificial intelligence (AI) receiver module.

The following detailed description of example implementations refers to the accompanying drawings. The same reference numbers in different drawings may identify the same or similar elements.

To communicate wirelessly, a transmitting device may convert a digital signal (e.g., representing a sequence of data symbols) into wireless signals (e.g., radio frequency (RF) signals). A receiving device may receive wireless signals from the transmitting device and convert the received wireless signals into a digital signal. The receiving device may use hard decoding to decode the digital signal into a sequence of data symbols (e.g., a sequence of bits) or may use soft decoding to decode the digital signal into a sequence of probabilities (e.g., log likelihood ratio (LLR) values).

Decoding wireless signals consumes power and processing resources, and any errors in decoding that cannot be corrected (e.g., using error correction codes) may result in retransmissions. Retransmissions consume additional power and processing resources and increase network overhead and congestion.

Advances in artificial intelligence (AI) enable the receiving device to include an AI receiver module, which can include a neural network (NN) to improve device decoding accuracy and thus reduce retransmissions. However, a reliability of the AI receiver module needs to be maintained over an operable life of the AI receiver module to ensure the device decoding accuracy. The process of creating, implementing, and overseeing AI receiver module across its operable life is called life cycle management (LCM).

Some implementations described herein include a management system. The management system may facilitate LCM of a receiver with an AI receiver module. The receiver may be, for example, included in a base station. The management may facilitate training data collection, such as for an NN (e.g., a neural network, a spiking neural network, a neuromorphic neural network, a binary neural network, and/or another kind of neural network) of the AI receiver module of the receiver; model inference (e.g., of the NN); model monitoring (e.g., of the NN); and model storage (e.g., of the NN).

In some implementations, a management system receives a wireless signal transmitted to a receiver and determines an SNR value associated with the wireless signal. The wireless signal may be one of a pilot wireless signal (e.g., a wireless signal that includes pilot symbols) or a pilotless wireless signal (e.g., a wireless signal that does not include pilot symbols). The management system determines, based on the wireless signal or a set of decoded bits associated with the wireless signal that were determined using an AI receiver module of the receiver, whether a CRC associated with the wireless signal is passed. Accordingly, the management system performs a data storage operation associated with the wireless signal, a fallback operation associated with the wireless signal, and/or an online label recovery operation associated with the wireless signal, as further described herein.

The management system then performs a model modification operation to update an NN (e.g., to updates weights of the NN) of the AI receiver module of the receiver (e.g., based on the wireless signal received and processed by the management system). In some implementations, the management system performs a model verification operation associated with the NN. For example, the management system may compare an original version of the NN and an updated version of the NN, and may thereby perform a model reversion operation (e.g., to retain the original version of the NN of the AI receiver module of the receiver) or a model update operation (e.g., to retain the updated version of the NN of the AI receiver module of the receiver).

In this way, some implementations allow for a collection of wireless signals (pilot wireless signal and/or pilotless wireless signals), which can be used to facilitate a continual update and verification of the NN of the of the AI receiver module of the receiver. Accordingly, some implementations enable the NN to be continually updated over an operable life of the receiver to improve a performance of the NN of the AI receiver module of the receiver (e.g., in terms of efficiency, accuracy, and other performance metric), and to reduce a likelihood of a diminished performance of the AI receiver module of the receiver, over the operable life of the receiver. Thus, the receiver is less likely to require retransmissions to accommodate for decoding errors, and therefore the receiver can reduce a utilization of additional power and processing resources (e.g., that would otherwise be needed to perform decoding operations associated with retransmissions) and also reduce network overhead and congestion. This continual updating and verification of the NN is not otherwise be possible using other techniques, such as those that would require disabling of the receiver to update NN.

FIG. 1 is a diagram of an example implementation 100 associated with LCM of a receiver with an AI receiver module. As shown in FIG. 1, example implementation 100 includes a transmitter 101, a transmitter 111, and a receiver 115. These devices are described in more detail below in connection with FIG. 2 and FIG. 3.

As shown in FIG. 1, the transmitter 101 passes a set of input bits through a channel encoder 103. The channel encoder 103 may use forward error correction (FEC) to add error-correcting codes (ECCs) to the set of input bits (e.g., resulting in a set of coded bits). The transmitter 101 further includes a symbol mapper 105 that modulates the set of coded bits by complex baseband symbols (e.g., resulting in a sequence of symbols). In some implementations, the transmitter 101 includes a pilot inserter 107 that inserts pilot symbols (e.g., known to the receiver 115) at specific locations in the sequence of symbols. The transmitter 101 may also include a precoder 109 that applies precoding to the sequence of symbols. The transmitter 101 may apply an inverse fast Fourier transform (IFFT) function on precoded output (and optionally append a cyclic prefix (CP)) to result in time domain samples that are transmitted over-the-air by a set of antennas of the transmitter 101 as wireless signals (e.g., over a channel, as shown in FIG. 1).

The transmitter 111 is similar to the transmitter 101 in that the transmitter 111 includes a channel encoder 103 and a precoder 109. However, the transmitter 111 includes a transmitter neural network (NN) 113, instead of a symbol mapper 105 and a pilot inserter 107. Accordingly, as further shown in FIG. 1, the transmitter 111 passes a set of input bits through the channel encoder 103. The channel encoder 103 may use FEC to add ECCs to the set of input bits (e.g., resulting in a set of coded bits), and the transmitter NN 113 generates, based on the set of coded bits, a sequence of symbols. The precoder 109 then applies precoding to the sequence of symbols. The transmitter 111 may apply an IFFT function on precoded output (and optionally append a CP) to result in time domain samples that are transmitted over-the-air by a set of antennas of the transmitter 111 as wireless signals (e.g., over a channel, as shown in FIG. 1).

In this way, the transmitter 101 and the transmitter 111 are respectively configured to transmit wireless signals. Because the wireless signals transmitted by the transmitter 101 include pilot symbols, these wireless signals are referred to herein as "pilot wireless signals," and because the wireless signals transmitted by the transmitter 111 do not include pilot symbols, these wireless signals are referred to herein as "pilotless wireless signals."

Wireless signals (e.g., pilot wireless signals or pilotless wireless signals) are received over-the-air by a set of antennas of the receiver 115 (e.g., over the channel). The receiver 115 may then select one of a non-AI receiver module 117 and an AI receiver module 131 (e.g., a neural receiver module, a neuromorphic receiver module, or another type of AI receiver module) to process the wireless signals.

In some implementations, the receiver 115 (e.g., using the non-AI receiver module 117) may remove the CP from the wireless signals and, as further shown in FIG. 1, may include, in the non-AI receiver module 117, a fast Fourier transform (FFT) function 119 that converts the wireless signals into frequency domain samples. For example, a frequency domain signal obtained by the receiver 115 may be represented as $$y_{mn} = h_{mn}x_{mn} + n_{mn},$$

where $x_{mn} \in \mathbb{C}$ (i.e., the set of complex numbers) represents a wireless signal from the transmitter 101, $y_{mn} \in \mathbb{C}$ represents a wireless signal at the receiver 115, $n_{mn} \in \mathbb{C}$ represents noise (e.g., additive white Gaussian noise (AWGN) with variance $N_0$, for $m \in \{0, \ldots, M-1\}$ and $n \in \{0, \ldots, N-1\}$), and $h_{mn} \in \mathbb{C}$ represents the channel between either the transmitter 101 or the transmitter 111 and the receiver 115 (or an effective channel, which is a multiplication of precoding and channel vectors).

The receiver 115 may further include, in the non-AI receiver module 117, a pilot extractor 121 that determines the pilot symbols (e.g., when the wireless signals are pilot wireless signals) and a channel estimator 123 that uses the pilot symbols to perform channel estimation over the pilot symbols. One example channel estimation algorithm is Least Squares (LS). For example, a channel estimate obtained by an LS algorithm (e.g., represented by $\hat{h}_{ij} \in \mathbb{C}$ and having an error variance represented by $$\sigma_{ij}^2$$

$\in \mathbb{R}$) may be represented as $$\hat{h}_{ij} = \frac{y_{ij} p_{ij}^*}{|p_{ij}|^2} = h_{ij} + \tilde{h}_{ij}, \text{ and}$$

$$\sigma_{in}^2 = \mathbb{E}[\tilde{h}_{ij} \tilde{h}_{ij}^*] = \frac{N_0}{|p_{ij}|^2},$$

where $\tilde{h}_{ij} \in \mathbb{C}$ represents an estimation error, $(\cdot)^*$ represents a conjugate operation, $y_{ij}$ represents the frequency domain signal, and $p_{ij}$ represents the pilot symbols.

The receiver 115 may use an interpolation mechanism to interpolate channel estimates and error variances in remaining symbols (e.g., orthogonal frequency-division multiplexed (OFDM) symbols) and OFDM subcarriers carrying data symbols. The receiver 115 may perform interpolation over time and/or frequency across pilot subcarriers. One example interpolation mechanism is a piecewise constant interpolation method that assumes the channel stays constant between two pilot locations. For example, if $k_1$ and $k_2$ represent two OFDM symbol indices carrying pilot symbols represented by $Q_P = k_2 - k_1$, channel estimates for remaining OFDM symbols (e.g., represented by $\hat{h}_{mn} \in \mathbb{C}$) may be represented as $$\hat{h}_{mn} = \mu_m \hat{h}_{k_1 n} + (1 - \mu_m) \hat{h}_{k_2 n},$$

where $\mu_m = m/Q_P$.

As further shown in FIG. 1, the receiver 115 may include, in the non-AI receiver module 117, an equalizer 125 that uses interpolated channel estimates to perform equalization on data symbols (e.g., represented by $y_{m'n} \in \mathbb{C}$, where $m' \in \{m \neq i\}$) to determine estimated data symbols (e.g., represented by $\hat{x}_{m'n} \in \mathbb{C}$). One example equalization is linear minimum mean square error (LMMSE) equalization, which may be represented as $$\hat{x}_{m'n} = \left((\hat{h}_{m'n})^* \hat{h}_{m'n} + \sigma_{m'}^2\right)^{-1} (\hat{h}_{m'n})^* y_{m'n}$$

where $$\sigma_{m'}^2$$

represents an error variance for a data symbol with index m'.

The receiver 115 may further include, in the non-AI receiver module 117, a symbol demapper 127 that determines soft probabilistic outputs (e.g., LLRs). An LLR for the $l^{th} = 0, \ldots, B-1$ bit of a symbol, where B represents a total number of bits per symbol, may be represented as $$LLR_{m'n}^l = \ln\left(\frac{Pr(b^l = 1 \mid \hat{x}_{m'n}^l)}{PR(b^l = 0 \mid x_{m'n}^l)}\right) \approx \ln\left(\frac{\sum_{c \in C_{l,1}} \exp(-|\hat{x}_{m'n}^l - c|^2 / \sigma_{m'}^2)}{\sum_{c \in C_{l,0}} \exp(-|\hat{x}_{m'n}^l - c|^2 / \sigma_{m'}^2)}\right),$$

where $$Pr(b^l = 1 \mid \hat{x}_{m'n}^l)$$

represents a conditional probability that a given symbol $$\hat{x}_{m'n}^l$$

represents a transmitted bit of 1 (e.g., $b^l = 1$), and $\mathcal{C}_{l,1}$ represents a constellation point where the $l^{th}$ bit is equal to 1. The receiver 115 may include, in the non-AI receiver module 117, a channel decoder 129 that converts the soft probabilistic outputs from the symbol demapper 127 into a set of decoded bits. The channel decoder 129 may use the ECCs added by the channel encoder 103 in order to perform error correction and obtain the set of input bits from the transmitter 101.

As further shown in FIG. 1, the AI receiver module 131 may use an NN 133 (e.g., a receiver NN 133) to replace the pilot extractor 121, the channel estimator 123, the equalizer 125, and the symbol demapper 127. Therefore, the NN 133 may accept a digital signal (e.g., a frequency domain sample from the FFT function 119) as input. The NN 133 may output soft probabilistic outputs (e.g., LLRs), and thus the channel decoder 129, of the AI receiver module 131, may convert the soft probabilistic outputs from the NN 133 into a set of decoded bits. Because the NN 133 performs channel estimation and equalization in addition to symbol demapping, performance is improved as compared with using separate machine learning models to replace separate components of the non-AI receiver module 117. In some implementations, the NN 133 includes a neural network, a spiking neural network, a neuromorphic neural network, a binary neural network, and/or another kind of neural network.

As indicated above, FIG. 1 is provided as an example. Other examples may differ from what is described with regard to FIG. 1.

Figure 2:
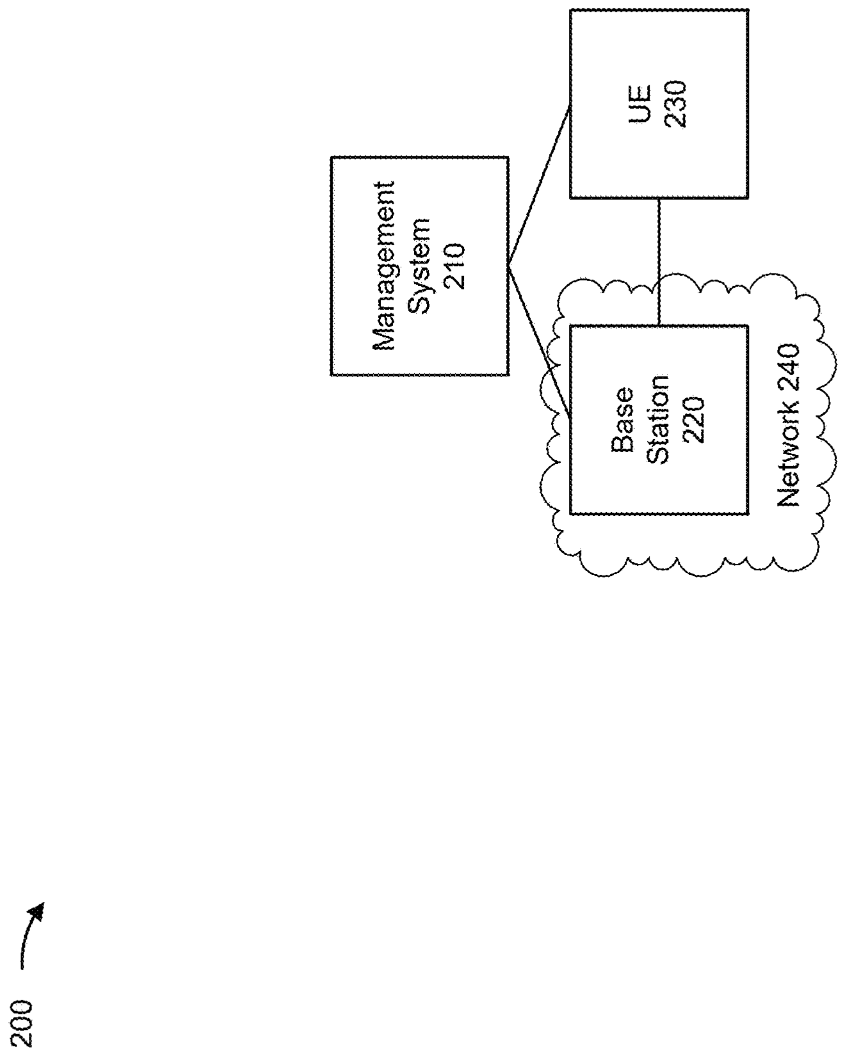
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a management system 210, a base station 220, a user equipment (UE) 230, and a network 240. Devices of environment 200 may interconnect via wired connections, wireless connections, or a combination of wired and wireless connections.

The management system 210 includes one or more devices capable of communicating with the base station 220, the UE 230, and/or a network (e.g., the network 240), such as to train and/or manage a model (e.g., an NN) used by the base station 220 and/or by the UE 230. The management system 210 may communicate with the base station 220 and/or the UE 230 by a wired connection, as described elsewhere herein. In some implementations, the management system 210 may wirelessly communicate with the base station 220 and/or the UE 230. In some implementations, the management system 210 is included in the base station 220 (e.g., the management system is part of the base station 220)

The management system 210 may include a communication and/or computing device, such as a server, an application server, a client server, a web server, a database server, a host server, a proxy server, a virtual server (e.g., executing on computing hardware), a server in a cloud computing system, or a similar type of device. The management system 210 may facilitate LCM of a receiver with an AI receiver module, as described herein.

The base station 220 includes one or more devices capable of communicating with a UE using a cellular radio access technology (RAT). For example, the base station 220 may include a base transceiver station, a radio base station, a node B, an evolved node B (eNB), a gNB, a base station subsystem, a cellular site, a cellular tower (e.g., a cell phone tower or a mobile phone tower), an access point, a transmit receive point (TRP), a radio access node, a macrocell base station, a microcell base station, a picocell base station, a femtocell base station, or a similar type of device. The base station 220 may transfer traffic between a UE (e.g., using a cellular RAT), other base stations 220 (e.g., using a wireless interface or a backhaul interface, such as a wired backhaul interface), and/or the network 240. The base station 220 may include a transmitter (e.g., the transmitter 101 and/or the transmitter 111) and/or a receiver (e.g., the receiver 115). Accordingly, the base station 220 may include a receiver that includes a non-AI receiver module (e.g., the non-AI receiver module 117) and/or an AI receiver module (e.g., the AI receiver module 131). The base station 220 may provide one or more cells that cover geographic areas. Some base stations 220 may be mobile base stations. Some base stations 220 may be capable of communicating using multiple RATs.

In some implementations, the base station 220 may perform scheduling and/or resource management for UEs covered by the base station 220 (e.g., UEs covered by a cell provided by the base station 220). In some implementations, the base station 220 may be controlled or coordinated by a network controller, which may perform load balancing and/or network-level configuration. The network controller may communicate with the base station 220 via a wireless or wireline backhaul. In some implementations, the base station 220 may include a network controller, a self-organizing network (SON) module or component, or a similar module or component. In other words, the base station 220 may perform network control, scheduling, and/or network management functions (e.g., for other base stations 220 and/or for uplink, downlink, and/or sidelink communications of UEs covered by the base station 220). In some implementations, the base station 220 may include a central unit and multiple distributed units. The central unit may coordinate access control and communication with regard to the multiple distributed units. The multiple distributed units may provide UEs and/or other base stations 220 with access to the network 240. In some implementations, the base station 220 may be capable of multiple input multiple output (MIMO) communication (e.g., beamformed communication).

The UE 230 may include one or more devices capable of communicating with the base station 220 and/or a network (e.g., the network 240). For example, the UE 230 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. The UE 230 may be capable of communicating using uplink (e.g., UE to base station) communications, downlink (e.g., base station to UE) communications, and/or sidelink (e.g., UE-to-UE) communications. In some implementations, the UE 230 may include a machine-type communication (MTC) UE, such as an evolved or enhanced MTC (eMTC) UE. In some implementations, the UE 230 may include an Internet of Things (IoT) UE, such as a narrowband IoT (NB-IoT) UE.

The UE 230 may function as a receiver for downlink communications and as a transmitter for uplink communications. Similarly, the base station 220 may function as a transmitter for downlink communications and as a receiver for uplink communications. Other wireless transmitters and receivers may be used (e.g., Bluetooth® devices, WiFi® devices, among other examples) instead of the UE 230 and/or the base station 220.

The network 240 includes one or more wired and/or wireless networks. For example, the network 240 may include a cellular network (e.g., a long-term evolution (LTE) network, a code division multiple access (CDMA) network, a third generation (3G) network, a fourth generation (4G) network, a fifth generation (5G) network, or another type of next generation network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The quantity and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
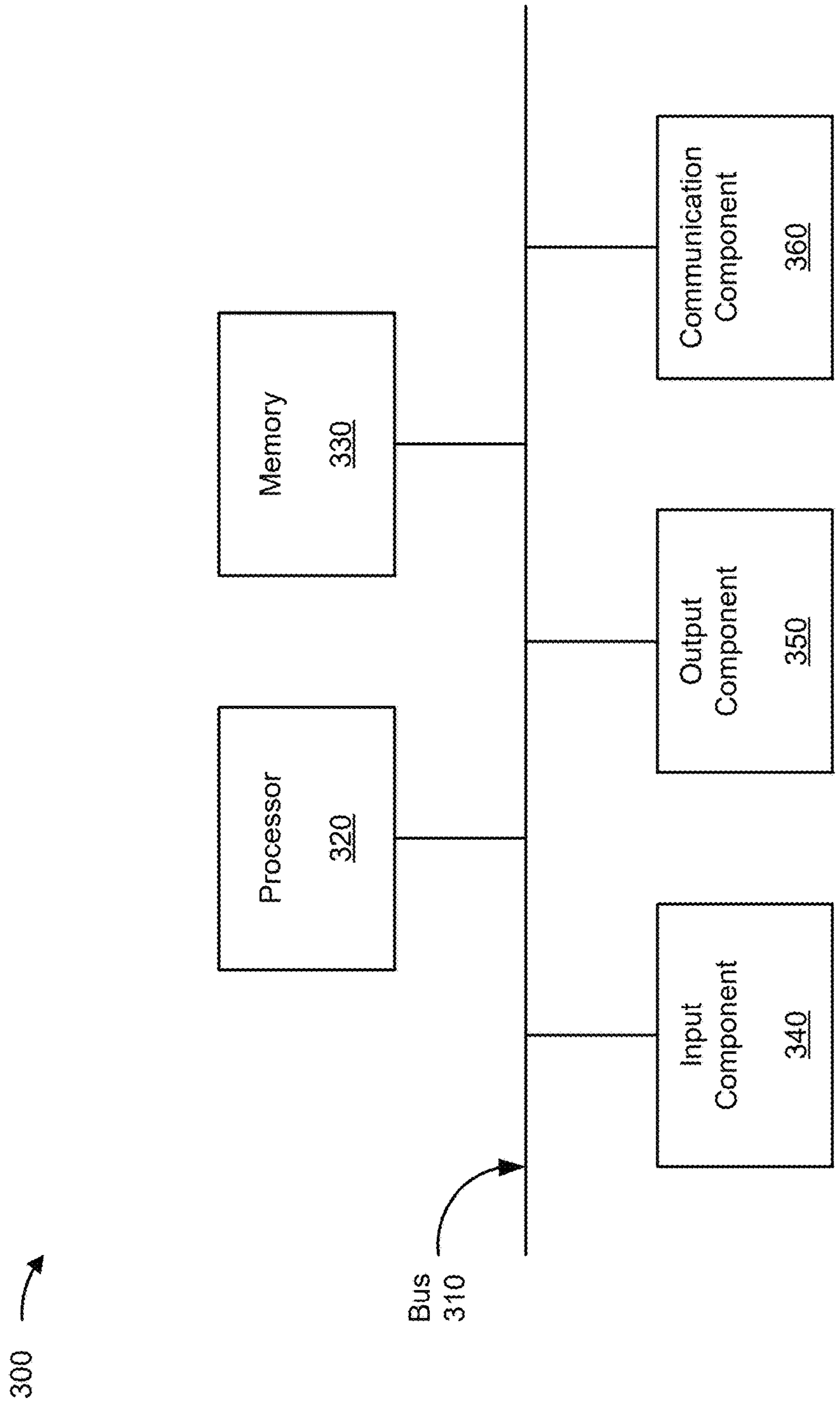
FIG. 3 is a diagram of example components of a device associated with LCM of a receiver with an AI receiver module.

FIG. 3 is a diagram of example components of a device 300 associated with LCM of a receiver with an AI receiver module. The device 300 may correspond to a management system 210, a base station 220, and/or a UE 230. In some implementations, a management system 210, a base station 220, and/or a UE 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
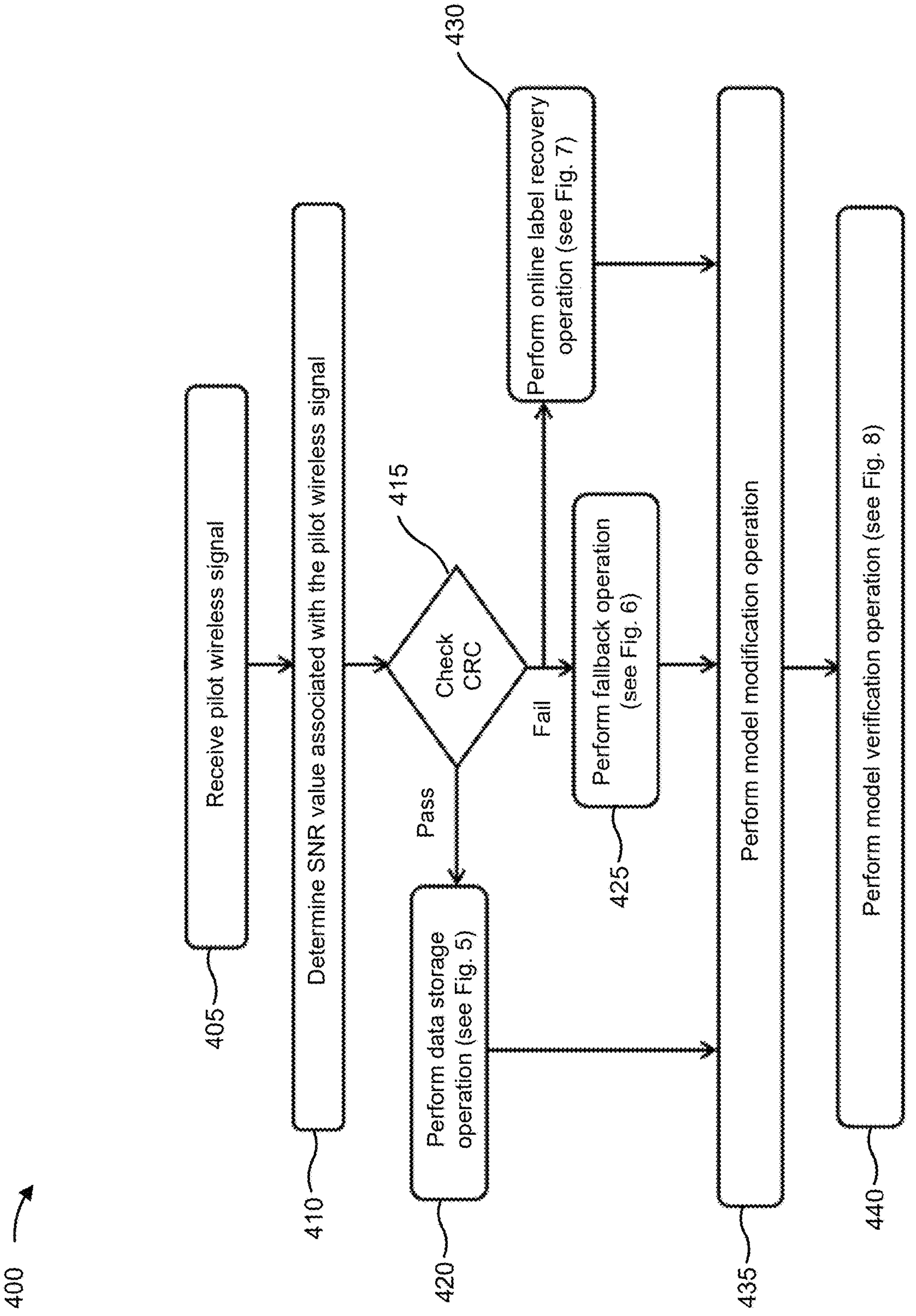
FIG. 4 is a flowchart of an example process associated with LCM of a receiver with an AI receiver module.

FIG. 4 is a flowchart of an example process 400 associated with LCM of a receiver with an AI receiver module. In some implementations, one or more process blocks of FIG. 4 are performed by a management system (e.g., the management system 210). In some implementations, one or more process blocks of FIG. 4 are performed by another device or a group of devices separate from or including the management system, such as a base station (e.g., the base station 220) and/or a UE (e.g. the UE 230). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a pilot wireless signal (block 405). For example, a transmitter (e.g., the transmitter 101) may transmit the pilot wireless signal to a receiver (e.g., the receiver 115), which may therefore receive the pilot wireless signal (e.g., from the transmitter). Additionally, the receiver may provide (e.g., send) the pilot wireless signal to the management system, which may therefore receive the pilot wireless signal (e.g., from the receiver). In some implementations, the receiver, using an AI receiver module (e.g., AI receiver module 131) of the receiver, may process the pilot wireless signal to determine a set of decoded bits associated with the pilot wireless signal (e.g., as described herein in relation to FIG. 1). The receiver may thereby provide (e.g., send) the set of decoded bits to the management system, which may therefore receive the set of decoded bits (e.g., from the receiver).

As shown in FIG. 4, process 400 may include determining an SNR value associated with the pilot wireless signal (block 410). For example, the management system may process the pilot wireless signal and/or the set of decoded bits to determine an SNR value associated with the pilot wireless signal. The management system may use one or more signal processing techniques to determine the SNR value, such as a wireless signal processing technique associated with 5G New Radio (5G-NR) (e.g., a reference signal measurement technique, an error vector magnitude (EVM)-based estimation technique, a channel-based estimation technique, or a blind SNR estimation technique, among other examples).

As shown in FIG. 4, process 400 may include determining whether a CRC associated with the pilot wireless signal is passed (block 415). For example, the management system may process the pilot wireless signal and/or the set of decoded bits to determine a computed CRC value and may compare the computed CRC value with a CRC value that is included in the pilot wireless signal (hereinafter referred to as the "included CRC value"). The management system may determine that the CRC is passed based on determining that the computed CRC value matches (e.g., is the same as, or is nearly the same as) the included CRC value. Process 400 then may include performing block 420. Alternatively, the management system may determine that the CRC is failed based on determining that the computed CRC value does not match the included CRC value. Process 400 then may include performing at least one of block 425 or block 430.

As shown in FIG. 4, process 400 may include performing a data storage operation associated with the pilot wireless signal (block 420). For example, the management system may perform a data storage operation associated with the pilot wireless signal by performing one or more operations described herein in relation to FIG. 5.

As shown in FIG. 4, process 400 may include performing a fallback operation associated with the pilot wireless signal (block 425). For example, the management system may perform a fallback operation associated with the pilot wireless signal by performing one or more operations described herein in relation to FIG. 6.

As shown in FIG. 4, process 400 may include performing an online label recovery operation associated with the pilot wireless signal (block 430). For example, the management system may perform an online label recovery operation associated with the pilot wireless signal by performing one or more operations described herein in relation to FIG. 7.

As shown in FIG. 4, process 400 may include performing a model modification operation (block 435). For example, the management system may perform a model modification operation by using a model modification technique to update an NN (e.g., the NN 133) of the AI receiver module of the receiver (e.g., to update weights of the NN). The model modification operation may include using a model agnostic meta-learning (MAML) technique (or a MAML++ technique), a prototypical network (ProtoNet) technique, a prototypical network and MAML (Proto-MAML) technique, a transfer learning technique, a meta-transfer learning technique, or an online retraining technique, among other examples, in association with information saved in a data structure (e.g., a second data structure, further described herein, that stores information associated with pilot wireless signals) to obtain an updated version of the NN. In some implementations, the management system may maintain an original version of the NN (e.g., the NN 133 prior to performance of the model modification operation) and/or the updated version of the NN (e.g., the NN 133 after performance of the model modification operation). In some implementations, the model modification technique may include switching the NN (e.g., to another type of model, or to another NN) to obtain the updated version of the NN. The management system may perform the model modification operation after completion of at least one of the data storage operation (e.g., as described herein in relation to block 420), the fallback operation (e.g., as described herein in relation to block 425), or the online label recovery operation (e.g., as described herein in relation to block 430).

As shown in FIG. 4, process 400 may include performing a model verification operation (block 440). For example, the management system may perform a model verification operation (e.g., associated with the NN of the AI receiver module of the receiver) by performing one or more operations described herein in relation to FIG. 8. The management system may perform the model verification operation after completion of the model modification operation (block 435).

Although FIG. 4 shows example blocks of process 4, in some implementations, process 4 includes additional blocks, fewer blocks, different blocks, or differently arranged blocks than those depicted in FIG. 4. Additionally, or alternatively, two or more of the blocks of process 4 may be performed in parallel.

Figure 5:
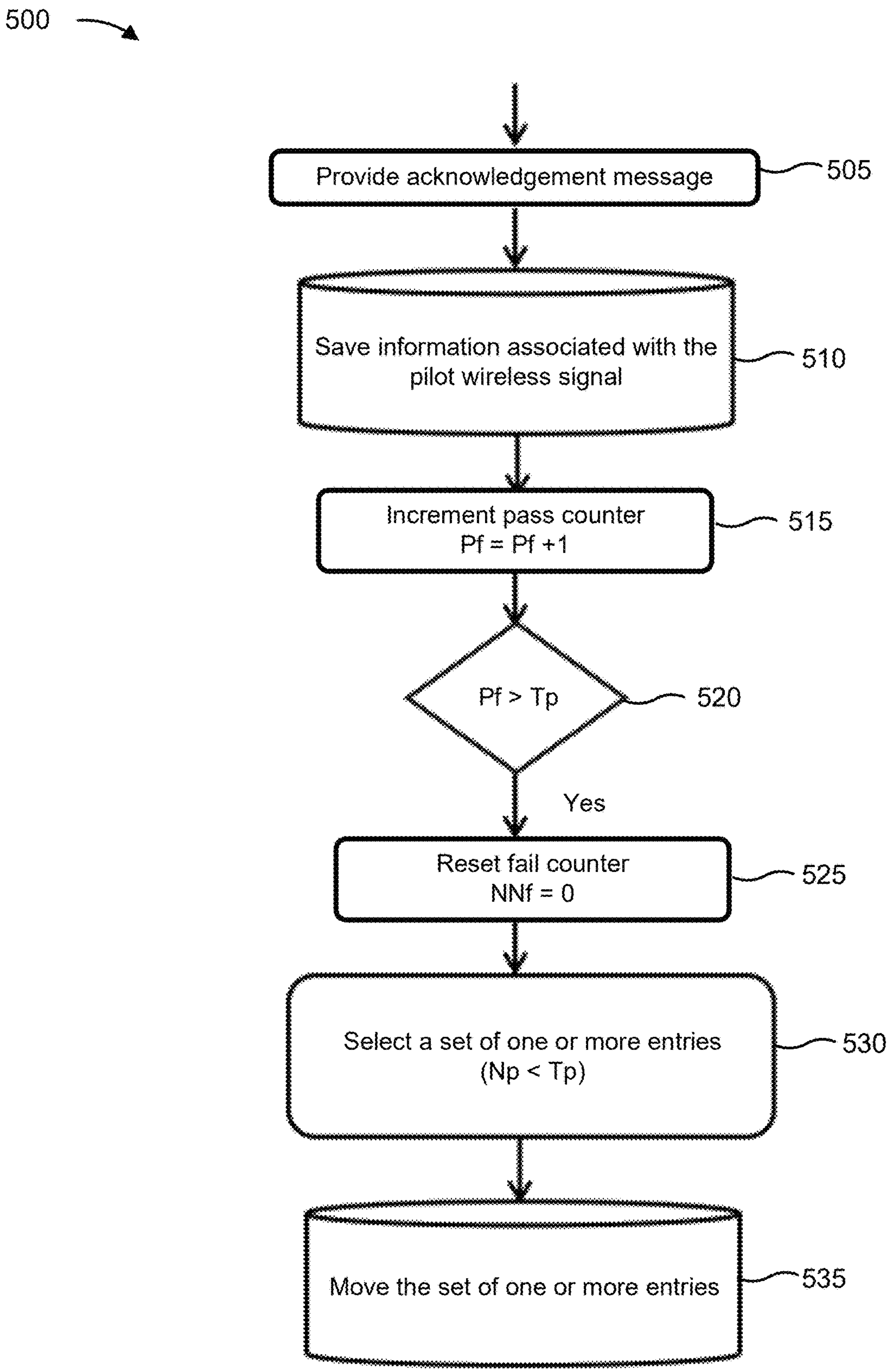
FIG. 5 is a flowchart of an example process associated with LCM of a receiver with an AI receiver module.

FIG. 5 is a flowchart of an example process 500 associated with LCM of a receiver with an AI receiver module. In some implementations, one or more process blocks of FIG. 5 are performed by a management system (e.g., the management system 210). In some implementations, one or more process blocks of FIG. 5 are performed by another device or a group of devices separate from or including the management system, such as a base station (e.g., the base station 220) and/or a UE (e.g. the UE 230). Additionally, or alternatively, one or more process blocks of FIG. 5 may be performed by one or more components of device 300, such as processor 320, memory 330, input component 340, output component 350, and/or communication component 360. The one or more process blocks of FIG. 5 may be performed in association with performing a data storage operation, as described herein in relation to block 420 of FIG. 4.

As shown in FIG. 5, process 500 may include providing an acknowledgement message associated with a pilot wireless signal (block 505). For example, the management system may provide an acknowledgement message associated with a pilot wireless signal (e.g., by sending the acknowledgement message) to a transmitter (e.g., the transmitter 101) that transmitted the pilot wireless signal (e.g., as described herein in relation to FIG. 4). In some implementations, the management system may send the acknowledgement message to a receiver (e.g., the receiver 115), such as a receiver associated with receiving the pilot wireless signal (e.g., as described herein in relation to FIG. 4), and therefore the receiver, using an AI receiver module (e.g., the AI receiver module 131) may provide (e.g., send) the acknowledgement message to the transmitter. The acknowledgement message may indicate that management system determined that a CRC associated with the pilot wireless signal is passed (e.g., as described herein in relation to blocks 415 and 420 of FIG. 4).

As shown in FIG. 5, process 500 may include saving information associated with the pilot wireless signal (block 510). For example, the management system may save information associated with the pilot wireless signal, such as in a first data structure (e.g., that is included in and/or accessible to the management system). The information associated with the pilot wireless signal may include the pilot wireless signal (e.g., as received by the receiver and/or the management system), decoded data associated with pilot wireless signal (e.g., a set of decoded bits that are determined by an AI receiver module of the receiver, such as described herein in relation to block 405 of FIG. 4), and/or an SNR value associated with the pilot wireless signal (e.g., that is determined by the management system, as described herein in relation to block 410 of FIG. 4). The information associated with the pilot wireless signal may be saved as an entry in the first data structure.

As shown in FIG. 5, process 500 may include incrementing a pass counter (block 515). For example, the management system may increment a pass counter (shown as Pf in FIG. 5) based on saving the data associated with the pilot wireless signal. The management system may increment the pass counter by adding one to a value of the pass counter (e.g., to cause Pf=Pf+1).

As shown in FIG. 5, process 500 may include determining whether the pass counter satisfies a pass counter threshold (block 520). For example, the management system may determine whether the pass counter (Pf) satisfies a pass counter threshold (shown as Tp in FIG. 5) by determining whether the pass counter is greater than the pass counter threshold. Accordingly, the management system may determine that the pass counter satisfies the pass counter threshold (e.g., Pf>Tp). Process 500 then may include performing at least one of block 525, block 530, or block 535. Alternatively, the management system may determine that the pass counter does not satisfy the pass counter threshold (e.g., Pf≤Tp). Process 500 may then not include performing block 525, block 530, and block 535.

As shown in FIG. 5, process 500 may include resetting a fail counter (block 525). For example, the management system may reset a fail counter (shown as NNf in FIG. 5) by setting a value of the fail counter to zero (0) (e.g., to cause NNf=0).

As shown in FIG. 5, process 500 may include selecting a set of one or more entries of the first data structure (block 530). For example, the management system may select a set of one or more entries of the first data structure, such that a total number of the one or more entries (shown as Np in FIG.

5) is less than the pass counter threshold (e.g., Np<Tp). The set of one or more entries may be a sample of the entries stored in the first data structure, where the set of one or more entries are associated with respective SNR values or respective SNR value ranges.

As shown in FIG. 5, process 500 may include moving the set of one or more entries (block 535). For example, the management system may move the set of one or more entries from the first data structure to a second data structure (e.g., that is included in and/or accessible to the management system). In this way, the management system may save the set of one or more entries in the second data structure. In some implementations, the network device management system may also remove any other entries (e.g., that are not included in the set of one or more entries) from the first data structure. In this way, based on moving the set of one or more entries, the management system may cause the first data structure to be empty (e.g., to have no saved entries).

In this way, the management system may save, to the second data structure, entries associated with some pilot wireless signals that are associated with a passed CRC. Notably, the management system may not save all such entries, because the entries saved in the second data structure are to be used to train (or retrain) an NN (e.g., the NN 133) of an AI receiver module (e.g., the AI receiver module 131) of the receiver (e.g., the receiver 115), and an overrepresentation of entries associated with passed CRCs may detrimentally impact the training (or retraining) of the NN. In some implementations, the first data structure may be referred to as a temporary data structure and the second data structure may be referred to as a non-temporary data structure.

Although FIG. 5 shows example blocks of process 5, in some implementations, process 5 includes additional blocks, fewer blocks, different blocks, or differently arranged blocks than those depicted in FIG. 5. Additionally, or alternatively, two or more of the blocks of process 5 may be performed in parallel.

Figure 6:
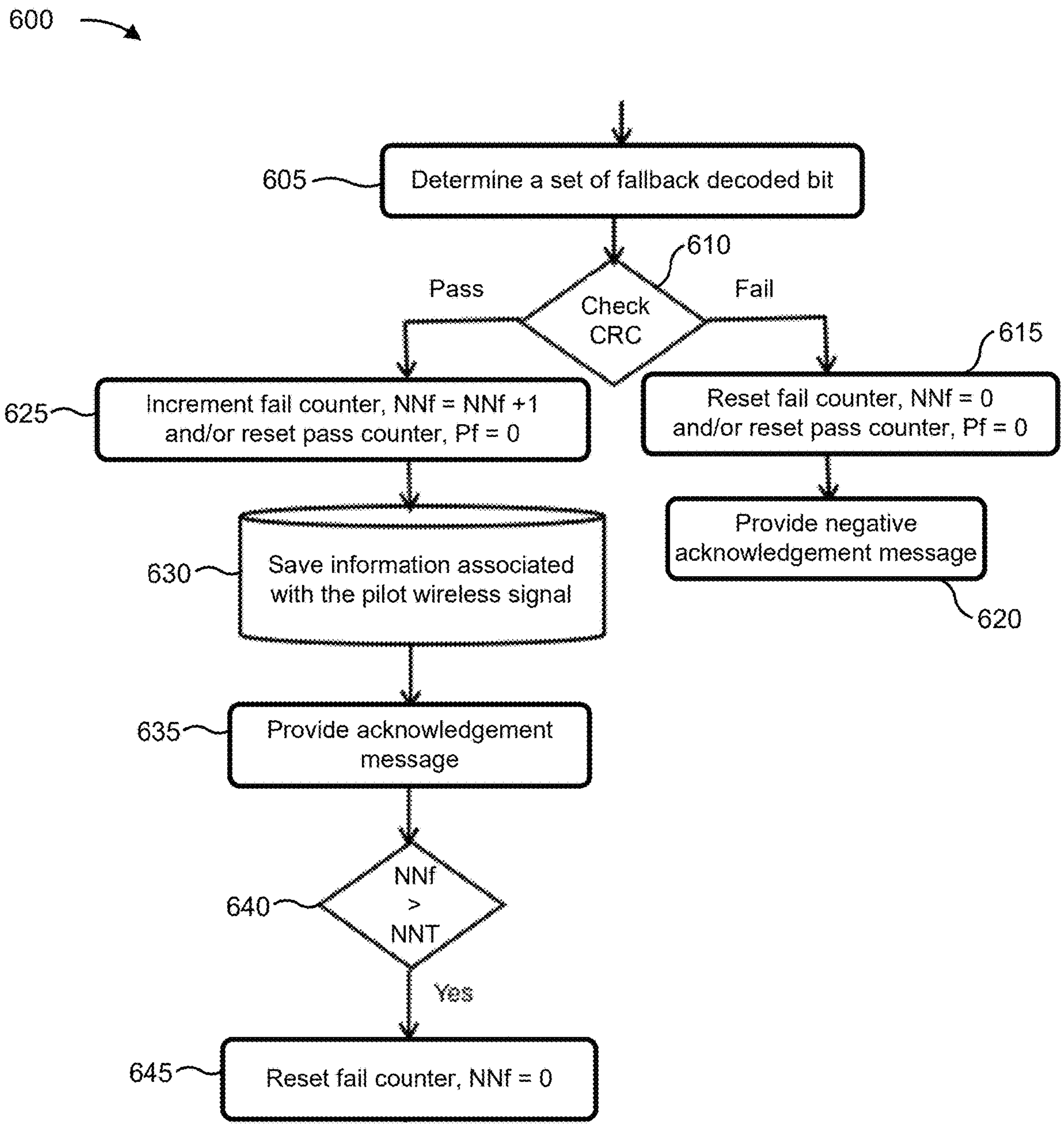
FIG. 6 is a flowchart of an example process associated with LCM of a receiver with an AI receiver module.

FIG. 6 is a flowchart of an example process 600 associated with LCM of a receiver with an AI receiver module. In some implementations, one or more process blocks of FIG. 6 are performed by a management system (e.g., the management system 210). In some implementations, one or more process blocks of FIG. 6 are performed by another device or a group of devices separate from or including the management system, such as a base station (e.g., the base station 220) and/or a UE (e.g. the UE 230). Additionally, or alternatively, one or more process blocks of FIG. 6 may be performed by one or more components of device 300, such as processor 320, memory 330, input component 340, output component 350, and/or communication component 360. The one or more process blocks of FIG. 6 may be performed in association with performing a fallback operation, as described herein in relation to block 425 of FIG. 4.

As shown in FIG. 6, process 600 may include determining a set of fallback decoded bits associated with the pilot wireless signal (block 605). For example, the network device management system may determine a set of fallback decoded bits associated with the pilot wireless signal by causing a receiver (e.g., the receiver 115) that received the pilot wireless signal to process the pilot wireless signal. The receiver may use a non-AI receiver module (e.g., the non-AI receiver module 117) to process the pilot wireless signal to determine the set of fallback decoded bits (e.g., as described herein in relation to FIG. 1). The receiver may thereby provide (e.g., send) the set of fallback decoded bits to the management system.

As shown in FIG. 6, process 600 may include determining whether another CRC associated with the fallback decoded bits is passed (block 610). For example, the management system may process the pilot wireless signal and/or the set of fallback decoded bits to determine another computed CRC value and may compare the computed CRC value with the included CRC (e.g., the CRC value that is included in the pilot wireless signal). The management system may determine that the other CRC is passed based on determining that the other computed CRC value matches (e.g., is the same as, or is nearly the same as) the included CRC value. Process 600 then may include performing at least one of blocks 625-645. Alternatively, the management system may determine that the CRC is failed based on determining that the other computed CRC value does not match the included CRC value. Process 600 then may include performing at least one of block 615 or block 620.

As shown in FIG. 6, process 600 may include at least one of resetting a fail counter or resetting a pass counter (block 615). For example, the management system may reset a fail counter (shown as NNf in FIG. 6) by setting a value of the fail counter to zero (0) (e.g., to cause NNf=0), and/or may reset a pass counter (shown as Pf in FIG. 6) by setting a value of the pass counter to zero (0) (e.g., to cause Pf=0). In this way, the management system may indicate that the management system has encountered a pilot wireless signal that has failed a first CRC that is associated with using an AI receiver module (e.g., the AI receiver module 131) of the receiver (e.g., as described herein in relation to block 415 of FIG. 4) and has failed a second CRC associated with using a non-AI receiver module (e.g., the non-AI receiver module 117) of the receiver (e.g., as described herein in relation to block 610 of FIG. 6).

As shown in FIG. 6, process 600 may include providing a negative acknowledgement message associated with the pilot wireless signal (block 620). For example, the management system may provide a negative acknowledgement message associated with the pilot wireless signal (e.g., by sending the negative acknowledgement message) to a transmitter (e.g., the transmitter 101) that transmitted the pilot wireless signal (e.g., as described herein in relation to FIG. 4). In some implementations, the management system may send the negative acknowledgement message to a receiver (e.g., the receiver 115), such as a receiver associated with receiving the pilot wireless signal (e.g., as described herein in relation to FIG. 4), and the receiver, using a non-AI receiver module (e.g., the non-AI receiver module 117) may provide (e.g., send) the negative acknowledgement message to the transmitter. The negative acknowledgement message may indicate that management system determined that the first CRC and the second CRC associated with the pilot wireless signal have both failed.

As shown in FIG. 6, process 500 may include at least one of incrementing the fail counter or resetting the pass counter (block 625). For example, the management system may increment the fail counter (shown as NNf in FIG. 6) and/or reset the pass counter (shown as Pf in FIG. 6) based on determining that the other CRC is passed (e.g., as described herein in relation to block 610 of FIG. 6). The management system may increment the fail counter by adding one to a value of the fail counter (e.g., to cause NNf=NNf+1). The management system may reset the pass counter by setting a value of the pass counter to zero (0) (e.g., to cause Pf=0).

As shown in FIG. 6, process 500 may include saving information associated with the pilot wireless signal (block 630). For example, the management system may save information associated with the pilot wireless signal, such as in a data structure (e.g., the second data structure described herein in relation to FIG. 5). The information associated with pilot wireless signal may include the pilot wireless signal (e.g., as received by the receiver and/or the management system), decoded data associated with pilot wireless signal (e.g., the set of fallback decoded bits that are determined by the non-AI receiver module of the receiver, such as described herein in relation to block 605 of FIG. 6), and/or an SNR value associated with the pilot wireless signal (e.g., that is determined by the management system, as described herein in relation to block 410 of FIG. 4). The data associated with the pilot wireless signal may be saved as an entry in the data structure.

As shown in FIG. 6, process 600 may include providing an acknowledgement message associated with the pilot wireless signal (block 635). For example, the management system may provide the acknowledgement message associated with the pilot wireless signal (e.g., by sending the acknowledgement message) to a transmitter (e.g., the transmitter 101) that transmitted the pilot wireless signal (e.g., as described herein in relation to FIG. 4). In some implementations, the management system may send the acknowledgement message to a receiver (e.g., the receiver 115), such as a receiver associated with receiving the pilot wireless signal (e.g., as described herein in relation to FIG. 4), and the receiver, using a non-AI receiver module (e.g., the non-AI receiver module 117) may provide (e.g., send) the acknowledgement message to the transmitter. The acknowledgement message may indicate that management system determined that a CRC associated with the pilot wireless signal is passed (e.g., as described herein in relation to block 610 of FIG. 6).

As shown in FIG. 6, process 600 may include determining whether the fail counter satisfies a fail counter threshold (block 640). For example, the management system may determine whether the fail counter (NNf) satisfies a fail counter threshold (shown as NNT in FIG. 6) by determining whether the fail counter is greater than the fail counter threshold. Accordingly, the management system may determine that the fail counter satisfies the fail counter threshold (e.g., NNf>NNT). Process 600 then may include performing block 645 and/or enabling performance of block 435 of FIG. 4 (e.g. to enable the management system to perform a model modification operation). In this way, the management system indicates that the management system has saved a sufficient amount of entries associated with passed other CRCs for training (or retraining) the NN 133. Alternatively, the management system may determine that the fail counter does not satisfy the fail counter threshold (e.g., NNf≤NNT). Process 600 then may not include performing block 645 or enabling performance of block 435 of FIG. 4.

As shown in FIG. 6, process 600 may include resetting the fail counter (block 645). For example, the management system may reset the fail counter (NNf), such as by setting a value of the fail counter to zero (0) (e.g., to cause NNf=0).

Although FIG. 6 shows example blocks of process 6, in some implementations, process 6 includes additional blocks, fewer blocks, different blocks, or differently arranged blocks than those depicted in FIG. 6. Additionally, or alternatively, two or more of the blocks of process 6 may be performed in parallel.

Figure 7:
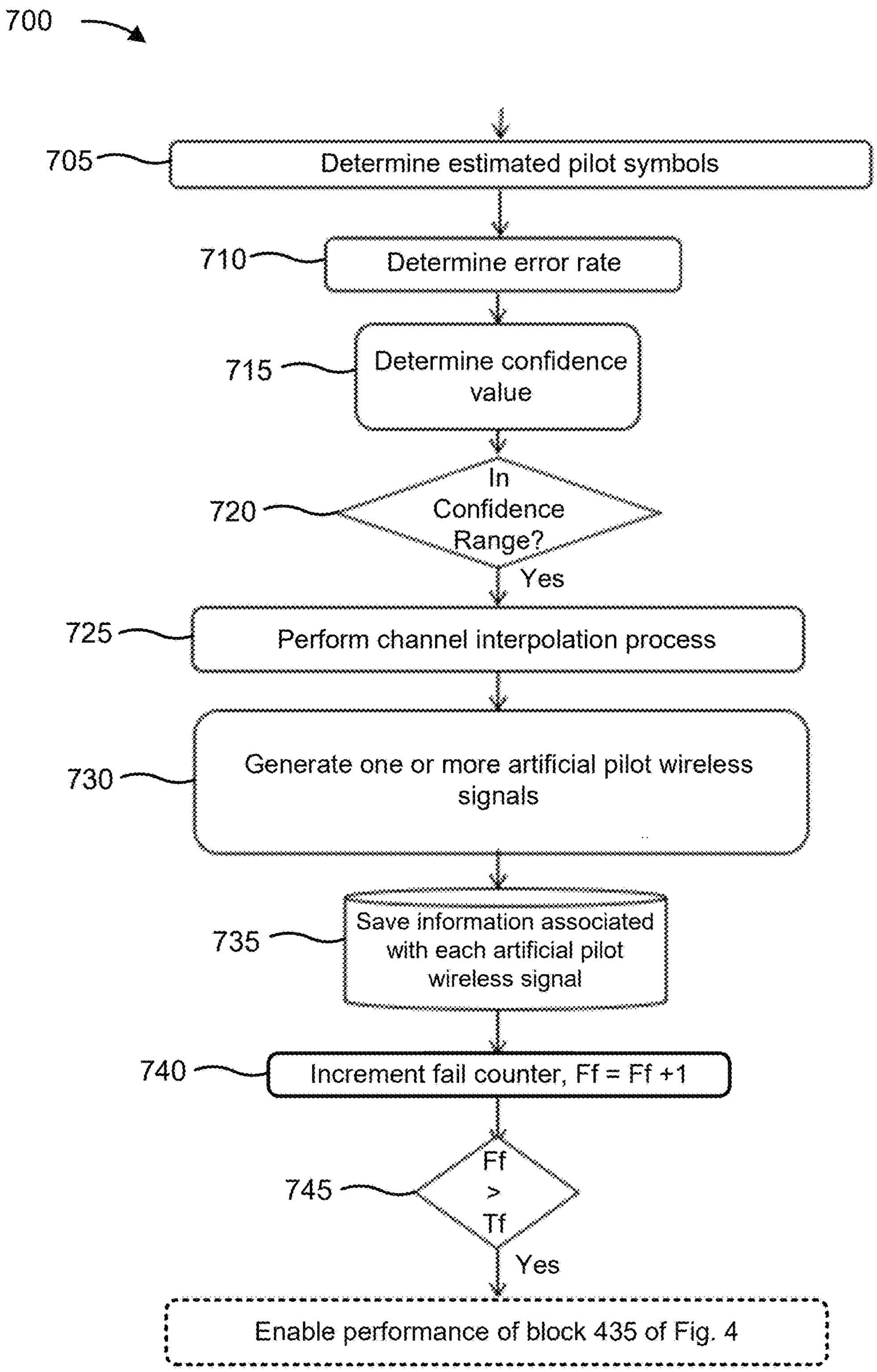
FIG. 7 is a flowchart of an example process associated with LCM of a receiver with an AI receiver module.

FIG. 7 is a flowchart of an example process 700 associated with LCM of a receiver with an AI receiver module. In some implementations, one or more process blocks of FIG. 7 are performed by a management system (e.g., the management system 210). In some implementations, one or more process blocks of FIG. 7 are performed by another device or a group of devices separate from or including the management system, such as a base station (e.g., the base station 220) and/or a UE (e.g. the UE 230). Additionally, or alternatively, one or more process blocks of FIG. 7 may be performed by one or more components of device 300, such as processor 320, memory 330, input component 340, output component 350, and/or communication component 360. The one or more process blocks of FIG. 7 may be performed in association with performing an online label recovery operation, as described herein in relation to block 430 of FIG. 4.

As shown in FIG. 7, process 700 may include determining estimated pilot symbols associated with the pilot wireless signal (block 705). For example, the network device management system may determine estimated pilot symbols associated with the pilot wireless signal, such as by causing a receiver (e.g., the receiver 115) that received the pilot wireless signal to process the pilot wireless signal. The receiver may use a non-AI receiver module (e.g., the non-AI receiver module 117) to process the pilot wireless signal to obtain the estimated pilot symbols (e.g., in a similar manner as that described herein in relation to FIG. 1). The receiver may thereby provide (e.g., send) the estimated pilot symbols to the management system.

As shown in FIG. 7, process 700 may include determining an error rate associated with the pilot wireless signal (block 710). For example, the management system may determine an error rate associated with the pilot wireless signal, such as by processing the estimated pilot symbols associated with the pilot wireless signal. In some implementations, the management system may obtain the pilot symbols (e.g., the actual pilot symbols that were included in the pilot wireless signal), such as by communicating with a transmitter (e.g., the transmitter 101) that transmitted the pilot wireless signal. Accordingly, the management system may compare the estimated pilot symbols and the pilot symbols to determine the error rate associated with the pilot wireless signal. The error rate may include, for example a bit error rate (BER), a symbol error rate (SER), or another type of error rate. In this way, the management system is able to determine an error rate based only on pilot symbols associated with the pilot wireless signal (and not data symbols associated with the pilot wireless signal).

As shown in FIG. 7, process 700 may include determining a confidence value associated with the pilot wireless signal (block 715). For example, the management system may determine a confidence value associated with the pilot wireless signal based on the error rate associated with the pilot wireless signal, and optionally, an SNR value associated with the pilot wireless signal (e.g., that is determined by the management system, as described herein in relation to block 410 of FIG. 4). The confidence value may be represented as $$CF = Err,$$

$$CF = m \times \log_2(1 + SNR) \times Err, \text{ or}$$

$$CF = m \times SNR \times Err,$$

where CF represents the confidence value, Err represents the error rate, SNR represents the SNR value, and m represents a scaling factor (e.g., where m>0).

As shown in FIG. 7, process 700 may include determining whether the confidence value is within a confidence range (block 720). For example, the management system may determine whether the confidence value is within a confidence range, such as by determining whether the confidence value is greater than or equal to a lower bound of the confidence range and less than or equal to an upper bound of the confidence range. The lower bound and the upper bound of the confidence range may be set by the management system based on configuration characteristics associated with the receiver. In some implementations, the management system may determine that the confidence value is within the confidence range. Process 700 then may include performing at least one of blocks 725-745. Alternatively, the management system may determine that the confidence value is not within the confidence range. Process 700 then may include not performing any of blocks 725-745.

As shown in FIG. 7, process 700 may include performing a channel interpolation process associated with the pilot wireless signal (block 725). For example, the management system may perform a channel interpolation process associated with the pilot wireless signal, such as by performing channel estimation (e.g., based on at least one of the estimated pilot symbols determined by the management system, as described herein in relation to block 705 of FIG. 7, or the actual pilot symbols that were included in the pilot wireless signal) and channel interpolation (e.g., using channel estimates generated as a result of performing the channel estimation) to generate interpolated channel estimates.

As shown in FIG. 7, process 700 may include generating one or more artificial pilot wireless signals (block 730). For example, the management system may generate one or more pilot artificial wireless signals, such as by generating at least one artificial pilot wireless signal for each of the interpolated channel estimates. Accordingly, an artificial pilot wireless signal may be represented as $$y = hx + n,$$

where y represents an artificial pilot wireless signal, $\underline{h}$ represents an interpolated channel estimate, x represents data (e.g., random, or semi-random, data of a desired modulation order for all data symbols of the pilot wireless signal), and n represents noise (e.g., an SNR value, such as based on AWGN).

As shown in FIG. 7, process 700 may include saving information associated with each artificial pilot wireless signal (block 735). For example, the management system may save information associated with an artificial pilot wireless signal, such as in a data structure (e.g., the second data structure described herein in relation to FIG. 5). The information associated with the artificial pilot wireless signal may include the artificial pilot wireless signal (e.g., represented by y in the formula above), data associated with the artificial pilot wireless signal (e.g., represented by x in the formula above), and/or an SNR value associated with the artificial pilot wireless signal (e.g., represented by n in the formula above). The information associated with the artificial pilot wireless signal may be saved as an entry in the data structure.

As shown in FIG. 7, process 700 may include incrementing a fail counter (block 740). For example, the management system may increment a fail counter (shown as Ff in FIG. 7) based on saving the information associated with each artificial wireless signal. The management system may increment the fail counter by adding one to a value of the fail counter (e.g., to cause Ff=Ff+1).

As shown in FIG. 7, process 700 may include determining whether the fail counter satisfies a fail counter threshold (block 745). For example, the management system may determine whether the fail counter (Ff) satisfies a fail counter threshold (shown as Tf in FIG. 7) by determining whether the fail counter is greater than the fail counter threshold. Accordingly, the management system may determine that the fail counter satisfies the fail counter threshold (e.g., Ff>Tf). Process 700 then may include enabling performance of block 435 of FIG. 4 (e.g. to enable the management system to perform a model modification operation). Alternatively, the management system may determine that the fail counter does not satisfy the fail counter threshold (e.g., Ff≤Tf). Process 700 then may not include enabling performance of block 435 of FIG. 4.

Although FIG. 7 shows example blocks of process 7, in some implementations, process 7 includes additional blocks, fewer blocks, different blocks, or differently arranged blocks than those depicted in FIG. 7. Additionally, or alternatively, two or more of the blocks of process 7 may be performed in parallel.

Figure 8:
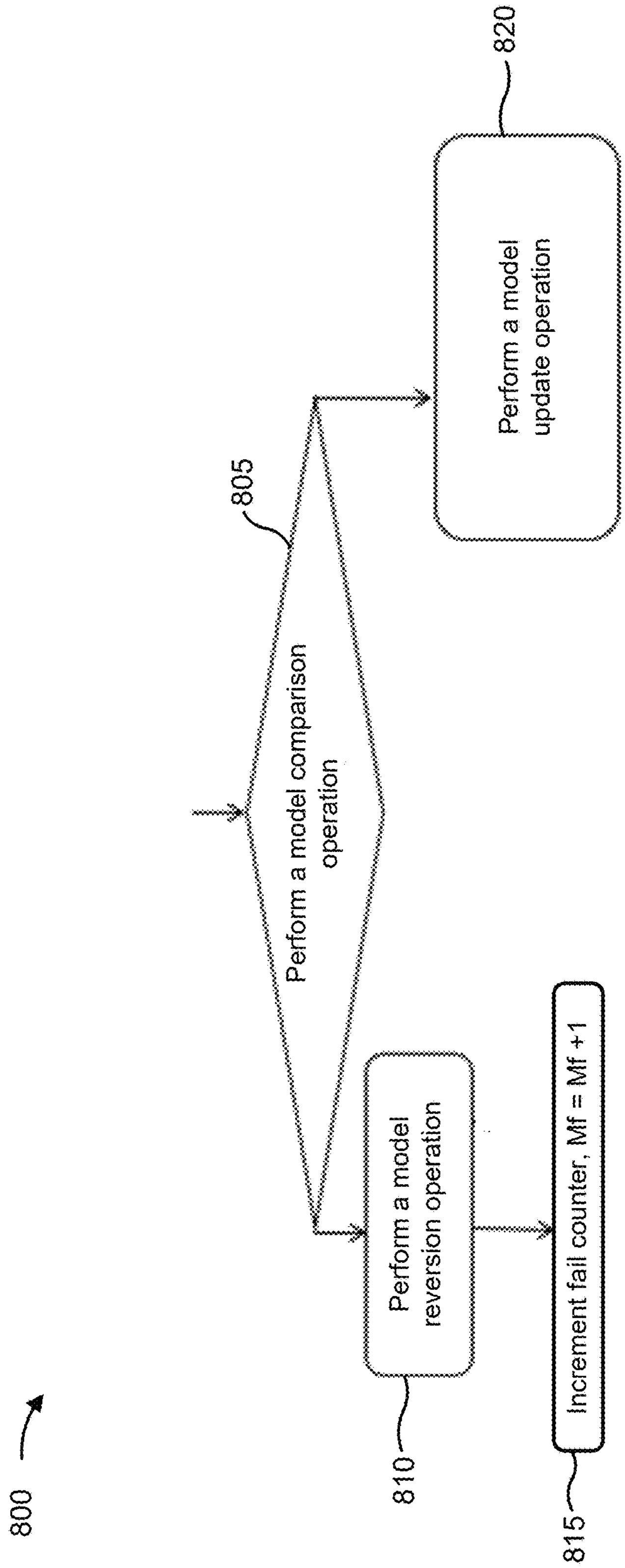
FIG. 8 is a flowchart of an example process associated with LCM of a receiver with an AI receiver module.

FIG. 8 is a flowchart of an example process 800 associated with LCM of a receiver with an AI receiver module. In some implementations, one or more process blocks of FIG. 8 are performed by a management system (e.g., the management system 210). In some implementations, one or more process blocks of FIG. 8 are performed by another device or a group of devices separate from or including the management system, such as a base station (e.g., the base station 220) and/or a UE (e.g. the UE 230). Additionally, or alternatively, one or more process blocks of FIG. 8 may be performed by one or more components of device 300, such as processor 320, memory 330, input component 340, output component 350, and/or communication component 360. The one or more process blocks of FIG. 8 may be performed in association with performing a model verification operation, as described herein in relation to block 440 of FIG. 4.

As shown in FIG. 8, process 800 may include performing a model comparison operation (block 805). For example, the management system may perform a model comparison operation by processing a set of pilot wireless signals (e.g., that are stored in respective entries of the second data structure, described herein) using an original version (e.g., prior to performance of the model modification operation described herein in relation to FIG. 4 and block 435) of an NN (e.g., the NN 133) of an AI receiver module (e.g., AI receiver module 131) of a receiver (e.g., receiver 115) to obtain first respective decoded bits for the set of pilot wireless signals, and by processing the set of pilot wireless signals using an updated version of the NN (e.g., the NN after performance of the model modification operation described herein in relation to FIG. 4 and block 435) to obtain second respective decoded bits for the set of pilot wireless signals. Accordingly, the management system may process the first respective decoded bits to determine first respective computed CRC values for the set of pilot wireless signals and may process the second respective decoded bits to determine second respective computed CRC values for the set of pilot wireless signals. The management system then may compare the first respective computed CRC values and the respective included CRCs (e.g., the CRC values that included in the set of pilot wireless signals) to determine a first CRC pass rate (e.g., a percentage of the first respective computed CRC values that match the respective included CRCs), and may compare the second respective computed CRC values and the respective included CRCs to determine a second CRC pass rate (e.g., a percentage of the second respective computed CRC values that match the respective included CRCs). The management system then may determine whether the first CRC pass rate and/or the second CRC pass rate satisfy (e.g., are greater than or equal to) a CRC pass rate threshold. When the processing system determines that first CRC pass rate satisfies CRC pass rate threshold and that the second CRC pass rate does not satisfy the CRC pass rate threshold, the process 800 may include performing at least one of block 810 or block 815. When the processing system determines that first CRC pass rate does not satisfy the CRC pass rate threshold and that the second CRC pass rate satisfies the CRC pass rate threshold, the process 800 may include performing block 820. In some implementations, instead of, or in addition to, determining computed CRC values, comparing computed CRC values, and determining whether CRC pass rates satisfy a CRC pass rate threshold, the management system may determine block error rate (BLER) values, compare BLER values, and determine whether BLER pass rates satisfy a BLER pass rate threshold.

As shown in FIG. 8, process 800 may include performing a model reversion operation (block 810). For example, the management system may perform a model reversion operation by retaining an original version of the NN of the receiver and by not retaining the updated version of the NN. Accordingly, the management system may notify a receiver (e.g., the receiver 115) that includes an AI receiver module (e.g., AI receiver module 131) to enable the AI receiver module to continue using the NN. In some implementations, the management system may also cause the set of pilot wireless signals to be saved (or resaved) in the data structure.

As shown in FIG. 8, process 800 may include incrementing a fail counter (block 815). For example, the management system may increment a fail counter (shown as Mf in FIG. 8) based on performing the model reversion operation. The management system may increment the fail counter by adding one to a value of the fail counter (e.g., to cause Mf=Mf+1).

As shown in FIG. 8, process 800 may include performing a model update operation (block 820). For example, the management system may perform a model reversion operation by retaining the updated version of the NN and by not retaining the original version of the NN. Accordingly, the management system may provide the updated version of the NN to a receiver (e.g., the receiver 115) that includes an AI receiver module (e.g., AI receiver module 131) to enable the AI receiver module to use the new version of the NN. In some implementations, the management system may also cause the set of pilot wireless signals to be discarded (e.g., deleted) from the data structure.

Although FIG. 8 shows example blocks of process 8, in some implementations, process 8 includes additional blocks, fewer blocks, different blocks, or differently arranged blocks than those depicted in FIG. 8. Additionally, or alternatively, two or more of the blocks of process 8 may be performed in parallel.

Figure 9:
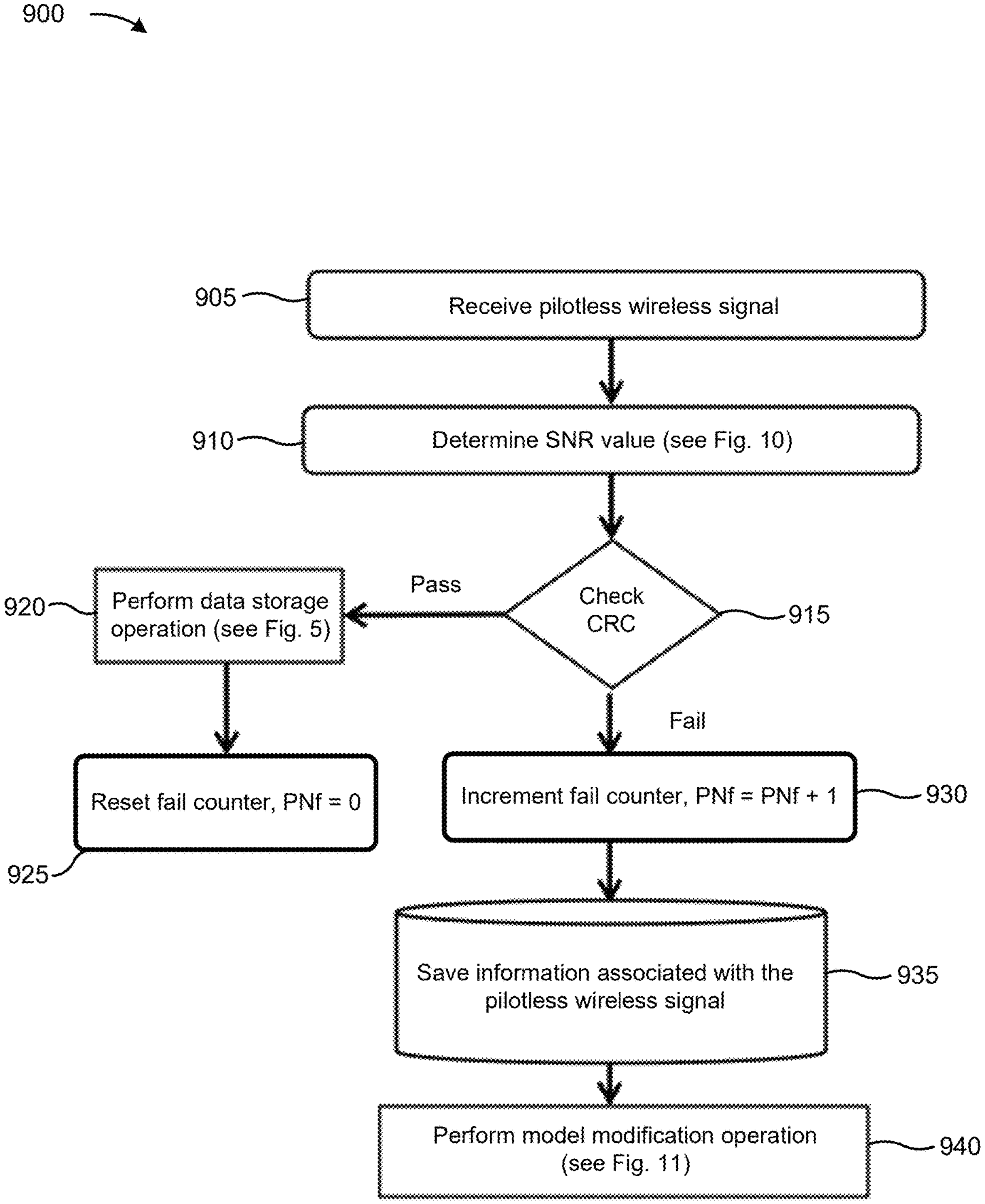
FIG. 9 is a flowchart of an example process associated with LCM of a receiver with an AI receiver module.

FIG. 9 is a flowchart of an example process 900 associated with LCM of a receiver with an AI receiver module. In some implementations, one or more process blocks of FIG. 9 are performed by a management system (e.g., the management system 210). In some implementations, one or more process blocks of FIG. 9 are performed by another device or a group of devices separate from or including the management system, such as a base station (e.g., the base station 220) and/or a UE (e.g. the UE 230). Additionally, or alternatively, one or more process blocks of FIG. 9 may be performed by one or more components of device 300, such as processor 320, memory 330, input component 340, output component 350, and/or communication component 360.

As shown in FIG. 9, process 900 may include receiving a pilotless wireless signal (block 905). For example, a transmitter (e.g., the transmitter 111) may transmit the pilotless wireless signal to a receiver (e.g., the receiver 115), which may therefore receive the pilotless wireless signal (e.g., from the transmitter). Additionally, the receiver may provide (e.g., send) the pilotless wireless signal to the management system, which may therefore receive the pilotless wireless signal (e.g., from the receiver). In some implementations, the receiver, using an AI receiver module (e.g., AI receiver module 131) of the receiver, may process the pilotless wireless signal to determine a set of decoded bits associated with the pilotless wireless signal (e.g., as described herein in relation to FIG. 1). The receiver may thereby provide (e.g., send) the set of decoded bits to the management system, which may therefore receive the set of decoded bits (e.g., from the receiver).

As shown in FIG. 9, process 900 may include determining an SNR value associated with the pilotless wireless signal (block 910). For example, the management system may determine an SNR value associated with the pilotless wireless signal by performing one or more operations described herein in relation to FIG. 10.

As shown in FIG. 9, process 900 may include determining whether a cyclic redundancy check (CRC) associated with the pilotless wireless signal is passed (block 915). For example, the management system may process the pilotless wireless signal and/or the set of decoded bits to determine a computed CRC value and may compare the computed CRC value with a CRC value that is included in the pilotless wireless signal (hereinafter referred to as the "included CRC value"). The management system may determine that the CRC is passed based on determining that the computed CRC value matches (e.g., is the same as, or is nearly the same as) the included CRC value. Process 900 then may include performing at least one of block 920 and block 925. Alternatively, the management system may determine that the CRC is failed based on determining that the computed CRC value does not match the included CRC value. Process 900 then may include performing at least one of block 930, block 935, or block 940.

As shown in FIG. 9, process 900 may include performing a data storage operation associated with the pilotless wireless signal (block 920). For example, the management system may perform a data storage operation associated with the pilotless wireless signal by performing one or more similar operations described herein in relation to FIG. 5 (e.g., by performing one or more of the operations described herein in relation to FIG. 5 for the pilotless wireless signal, instead of for a pilot wireless signal).

As shown in FIG. 9, process 900 may include resetting a fail counter (block 925). For example, the management system may reset a fail counter (shown as PNf in FIG. 9) by setting a value of the fail counter to zero (0) (e.g., to cause PNf=0) (e.g., based on determining that the CRC is passed, as described herein in relation to block 915).

As shown in FIG. 9, process 900 may include incrementing the fail counter (block 930). For example, the management system may increment the fail counter (shown as PNf in FIG. 9) based on determining that the CRC is failed, as described herein in relation to block 915. The management system may increment the fail counter by adding one to a value of the fail counter (e.g., to cause PNf=PNf+1).

As shown in FIG. 9, process 900 may include saving information associated with the pilotless wireless signal (block 935). For example, the management system may save information associated with the pilotless wireless signal, such as in a third data structure (e.g., that is included in and/or accessible to the management system, and that may be different than the first data structure and the second data structure described herein). The information associated with the pilotless wireless signal may include the pilotless wireless signal (e.g., as received by the receiver and/or the management system), decoded data associated with pilotless wireless signal (e.g., a set of decoded bits decoded bits that are determined by an AI receiver module of the receiver, such as described herein in relation to block 905 of FIG. 9), and/or an SNR value associated with the pilotless wireless signal (e.g., that is determined by the management system, as described herein in relation to block 910 of FIG. 9). The information associated with the pilotless wireless signal may be saved as an entry in the third data structure.

As shown in FIG. 9, process 900 may include performing a model modification operation (block 940). For example, the management system may perform a model modification operation by performing one or more operations described herein in relation to FIG. 11.

Although FIG. 9 shows example blocks of process 4, in some implementations, process 9 includes additional blocks, fewer blocks, different blocks, or differently arranged blocks than those depicted in FIG. 9. Additionally, or alternatively, two or more of the blocks of process 9 may be performed in parallel.

Figure 10:
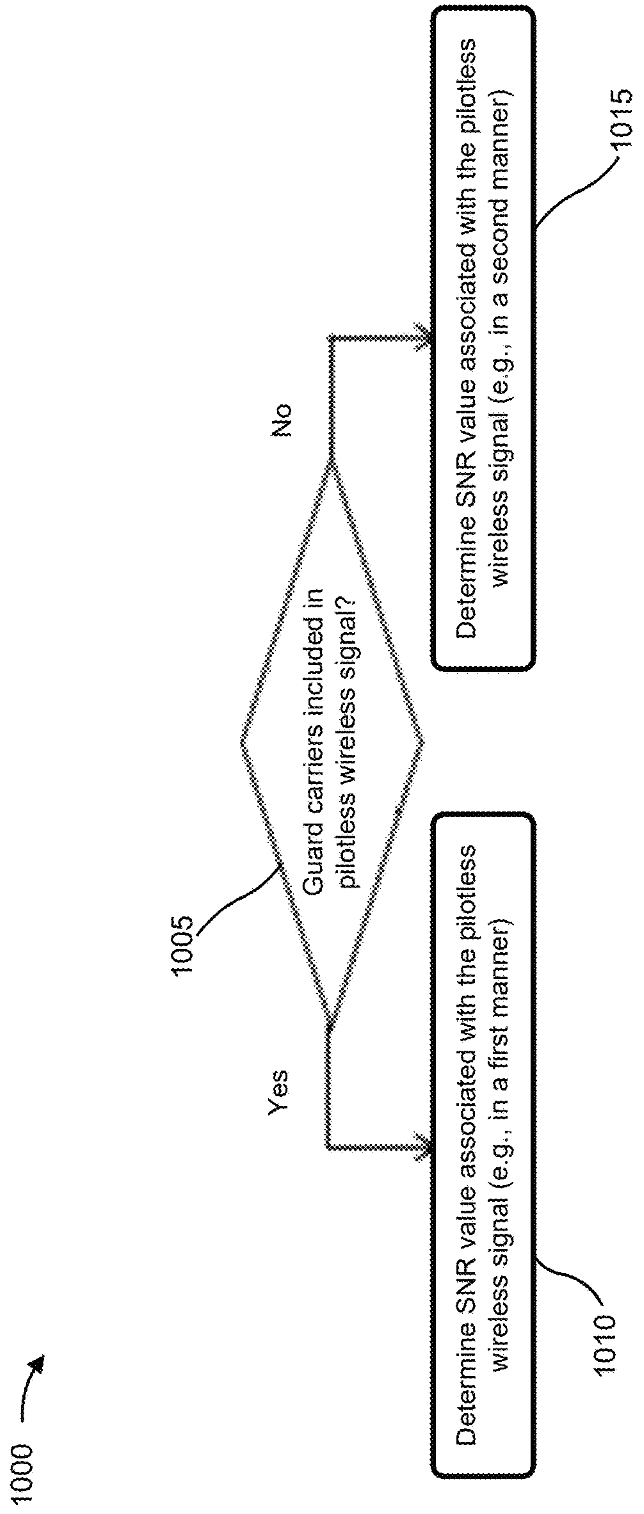
FIG. 10 is a flowchart of an example process associated with LCM of a receiver with an AI receiver module.

FIG. 10 is a flowchart of an example process 1000 associated with LCM of a receiver with an AI receiver module. In some implementations, one or more process blocks of FIG. 10 are performed by a management system (e.g., the management system 210). In some implementations, one or more process blocks of FIG. 10 are performed by another device or a group of devices separate from or including the management system, such as a base station (e.g., the base station 220) and/or a UE (e.g. the UE 230). Additionally, or alternatively, one or more process blocks of FIG. 10 may be performed by one or more components of device 300, such as processor 320, memory 330, input component 340, output component 350, and/or communication component 360. The one or more process blocks of FIG. 10 may be performed in association with determining an SNR value associated with a pilotless wireless signal, as described herein in relation to block 910 of FIG. 9.

As shown in FIG. 10, process 1000 may include determining whether guard carriers are included in the pilotless wireless signal (block 1005). For example, the management system may process (e.g., parse and/or read) the pilotless wireless signal to determine whether guard carriers are included in the pilotless wireless signal. Accordingly, when the management system determines that guard carriers are included in the pilotless wireless signal, the process 1000 then may include performing block 1010. Alternatively, when the management system determines that guard carriers are not included in the pilotless wireless signal, the process 1000 then may include performing block 1015.

As shown in FIG. 10, process 1000 may include determining an SNR value associated with the pilotless wireless signal (block 1010) (e.g., in a first manner). For example, the management system may process the pilotless wireless signal and/or decoded data associated with pilotless wireless signal (e.g., a set of decoded bits decoded bits that are determined by an AI receiver module of the receiver, such as described herein in relation to block 905 of FIG. 9) to determine an SNR value associated with the pilotless wireless signal. The management system may use one or more signal processing techniques to determine the SNR value, such as a wireless signal processing technique associated with 5G-NR (e.g., a reference signal measurement technique, an EVM-based estimation technique, a channel-based estimation technique, or a blind SNR estimation technique, among other examples). In some implementations, the management system may process the pilotless wireless signal to determine a noise power (e.g., associated with the guard carriers of the pilotless wireless signal) and to determine a signal power, and may thereby calculate the SNR value as the signal power divided by the noise power.

As shown in FIG. 10, process 1000 may include determining an SNR value associated with the pilotless wireless signal (block 1015) (e.g., in a second manner). For example, the management system may process control information associated with the pilotless wireless signal to determine the SNR value associated with the pilotless wireless signal. For example, the management system may process a synchronization signal block (SSB), or other control information, to determine a noise power associated with the pilotless wireless signal. The management system may then determine the SNR value based on the noise power.

Although FIG. 10 shows example blocks of process 4, in some implementations, process 10 includes additional blocks, fewer blocks, different blocks, or differently arranged blocks than those depicted in FIG. 10. Additionally, or alternatively, two or more of the blocks of process 10 may be performed in parallel.

Figure 11:
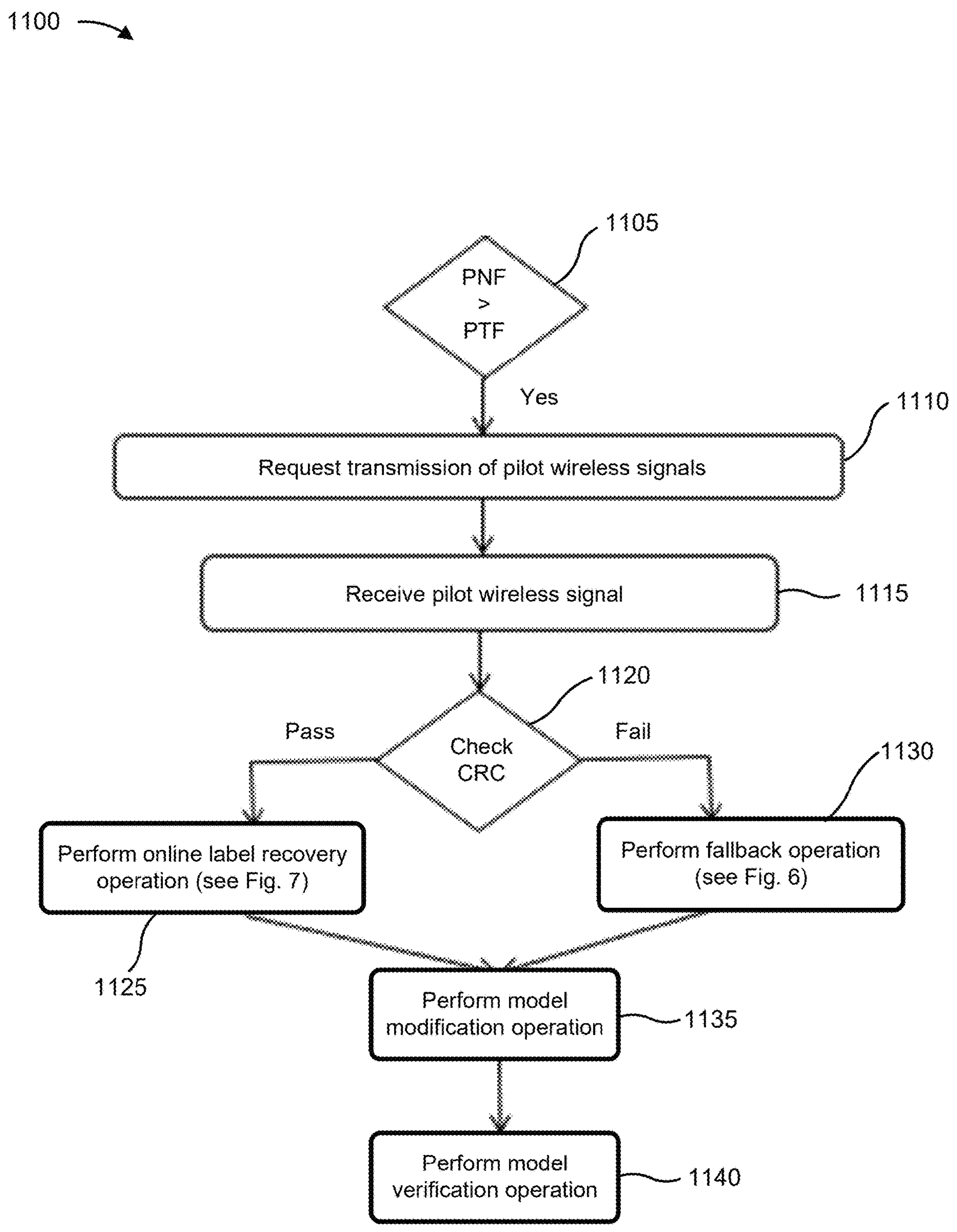
FIG. 11 is a flowchart of an example process associated with LCM of a receiver with an AI receiver module.

FIG. 11 is a flowchart of an example process 1100 associated with LCM of a receiver with an AI receiver module. In some implementations, one or more process blocks of FIG. 11 are performed by a management system (e.g., the management system 210). In some implementations, one or more process blocks of FIG. 11 are performed by another device or a group of devices separate from or including the management system, such as a base station (e.g., the base station 220) and/or a UE (e.g. the UE 230). Additionally, or alternatively, one or more process blocks of FIG. 11 may be performed by one or more components of device 300, such as processor 320, memory 330, input component 340, output component 350, and/or communication component 360. The one or more process blocks of FIG. 11 may be performed in association with performing a model modification operation, as described herein in relation to block 940 of FIG. 9.

As shown in FIG. 11, process 1100 may include determining whether a fail counter satisfies a fail counter threshold (block 1105). For example, the management system may determine whether a fail counter (shown as PNf in FIG. 11) satisfies a fail counter threshold (shown as PTf in FIG. 11) by determining whether the fail counter is greater than the fail counter threshold. Accordingly, the management system may determine that the fail counter satisfies the fail counter threshold (e.g., PNf>PTf). Process 1100 then may include performing at least one other block described herein in relation to FIG. 11. Alternatively, the management system may determine that the fail counter does not satisfy the fail counter threshold (e.g., PNf≤PTf). Process 1100 may then not include performing any other block described herein in relation to FIG. 11.

As shown in FIG. 11, process 1100 may include requesting transmission of pilot wireless signals (block 1110). For example, the management system may request transmission of pilot wireless signals by transmitting control information (e.g., a radio resource control (RRC), a physical uplink shared channel (PUSCH), or other control information) to a transmitter (e.g., the transmitter 111), which may therefore receive the control information (e.g., from the management system). The control information may request that the transmitter cease transmitting pilotless wireless signals and/or may request that the transmitter transmit pilot wireless signals.

As shown in FIG. 11, process 1100 may include receiving a pilot wireless signal (block 1115). For example, the transmitter may transmit the pilot wireless signal (e.g., based on receiving the control information transmitted by the management system, as described herein in relation to FIG. 1110) to a receiver (e.g., the receiver 115), which may therefore receive the pilot wireless signal (e.g., from the transmitter). Additionally, the receiver may provide (e.g., send) the pilot wireless signal to the management system, which may therefore receive the pilot wireless signal (e.g., from the receiver). In some implementations, the receiver, using an AI receiver module (e.g., AI receiver module 131) of the receiver, may process the pilot wireless signal to obtain a set of decoded bits associated with the pilot wireless signal (e.g., as described herein in relation to FIG. 1). The receiver may thereby provide (e.g., send) the set of decoded bits to the management system.

As shown in FIG. 11, process 1100 may include determining whether a CRC associated with the pilot wireless signal is passed (block 1120). For example, the management system may process the pilot wireless signal and/or the set of decoded bits to determine whether the CRC is passed, in a similar manner as that described herein in relation to FIG. 4 and block 415. When the management system determines that the CRC is passed, process 1100 may include performing block 1125. Alternatively, when the management system determines that the CRC is failed, process 1100 may include performing block 1130.

As shown in FIG. 11, process 1100 may include performing an online label recovery operation associated with the pilot wireless signal (block 1125). For example, the management system may perform an online label recovery operation associated with the pilot wireless signal by performing one or more similar operations to the operations described herein in relation to FIG. 7. For example, the management system may remove a pilot symbol from the pilot wireless signal in association with any one operation of process 700 to cause the pilot wireless signal to be processed as a pilotless wireless signal.

As shown in FIG. 11, process 1100 may include performing a fallback operation associated with the pilot wireless signal (block 1130). For example, the management system may perform a fallback operation associated with the pilot wireless signal by performing one or more similar operations to the operations described herein in relation to FIG. 6. For example, the management system may remove a pilot symbol from the pilot wireless signal in association with any one operation of process 600 to cause the pilot wireless signal to be processed as a pilotless wireless signal. Accordingly, process 600 may include performing a channel interpolation process associated with the pilot wireless signal (e.g., prior to saving information associated with the pilot wireless signal, as described in relation to block 630), such as in a similar manner as that described herein in relation to FIG. 7 and block 725.

As shown in FIG. 11, process 1100 may include performing a model modification operation (block 1135). For example, the management system may perform a model modification, such as in a similar manner as that described herein in relation to FIG. 4 and block 435. The management system may perform the model modification operation after completion of at least one of the online label recovery operation (e.g., as described herein in relation to block 1125) or the fallback operation (e.g., as described herein in relation to block 1130).

As shown in FIG. 11, process 1100 may include performing a model verification operation (block 1140). For example, the management system may perform a model verification operation by performing one or more similar operations to the operations described herein in relation to FIG. 8. For example, the management system may process a set of pilotless wireless signals (e.g., that are stored in the third data structure), instated of a set of pilot wireless signals, in association with performing a model comparison operation (e.g., as described herein in relation to block 805). The management system may perform the model verification operation after completion of the model modification operation (block 1135).

Although FIG. 11 shows example blocks of process 11, in some implementations, process 4 includes additional blocks, fewer blocks, different blocks, or differently arranged blocks than those depicted in FIG. 11. Additionally, or alternatively, two or more of the blocks of process 11 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A management system, comprising:
- one or more memories; and
- one or more processors, communicatively coupled to the one or more memories, configured to:
  - receive a wireless signal transmitted to a receiver,
    - wherein the wireless signal is one of a pilot wireless signal or a pilotless wireless signal;
  - determine a signal-to-noise ratio (SNR) value associated with the wireless signal;
  - determine, based on the wireless signal or a set of decoded bits associated with the wireless signal that were determined using an artificial intelligence (AI) receiver module of the receiver, whether a cyclic redundancy check (CRC) associated with the wireless signal is passed;
  - perform, based on determining whether the CRC associated with the wireless signal is passed, a model modification operation to update a neural network (NN) of the AI receiver module of the receiver; and
  - perform a model verification operation associated with the NN.

2. The management system of claim 1, wherein the wireless signal is a pilot wireless signal, and
- wherein the one or more processors, to determine the SNR value, are configured to:
  - process, using a wireless signal processing technique associated with fifth generation new radio (5G-NR), at least one of the wireless signal or the set of decoded bits to determine the SNR value.

3. The management system of claim 1, wherein the wireless signal is a pilotless wireless signal, and
- wherein the one or more processors, to determine the SNR value, are configured to:
  - determine whether guard carriers are included in the wireless signal; and
  - one of:
    - process, based on determining that guard carriers are included in the wireless signal, using a wireless signal processing technique associated with fifth generation new radio (5G-NR), at least one of the wireless signal or the set of decoded bits to determine the SNR value; or
    - process, based on determining that guard carriers are not included in the wireless signal, control information associated with the wireless signal to determine the SNR value.

4. The management system of claim 1, wherein the one or more processors are further configured to:
- perform, based on determining that the CRC associated with the wireless signal is passed, a data storage operation associated with the wireless signal.

5. The management system of claim 4, wherein the one or more processors, to perform the data storage operation associated with the wireless signal, are configured to:
- provide an acknowledgement message associated with the wireless signal;
- save information associated with the wireless signal in a first data structure;
- determine that a pass counter satisfies a pass counter threshold;
- select, based on determining that the pass counter satisfies the pass counter threshold, a set of one or more entries of the first data structure; and
- move the set of one or more entries to a second data structure.

6. The management system of claim 1, wherein the one or more processors are further configured to:
- perform, based on determining that the CRC associated with the wireless signal is failed, a fallback operation associated with the wireless signal.

7. The management system of claim 6, wherein the one or more processors, to perform the fallback operation associated with the wireless signal, are configured to:
- determine, based on the wireless signal or a set of fallback decoded bits associated with the wireless signal that are determined using a non-AI receiver module of the receiver, that another CRC associated with the wireless signal is passed;
- save, based on determining that the other CRC associated with the wireless signal is passed, information associated with the wireless signal in a data structure; and
- provide, based on saving the information associated with the wireless signal, an acknowledgement message associated with the wireless signal.

8. The management system of claim 1, wherein the one or more processors are further configured to:
- perform, based on determining that the CRC associated with the wireless signal is failed, an online label recovery operation associated with the wireless signal.

9. The management system of claim 8, wherein the one or more processors, to perform the online label recovery operation associated with the wireless signal, are configured to:
- determine estimated pilot symbols associated with the wireless signal;

determine, based on the estimated pilot symbols, an error rate associated with the wireless signal;

determine, based on the error rate, a confidence value associated with the wireless signal;

determine that the confidence value is within a confidence range;

perform, based on determining that the confidence value is within the confidence range, a channel interpolation process;

generate, based on performing the channel interpolation process, one or more artificial pilot wireless signals; and save information associated with each artificial pilot wireless signal, of the one or more artificial pilot wireless signals, in a data structure.

10. The management system of claim 1, wherein the wireless signal is a pilotless wireless signal, and wherein the one or more processors, to perform the model modification operation, are configured to:

determine, based on determining that the CRC associated with the wireless signal is failed, that a fail counter satisfies a fail counter threshold;

request, based on determining that the fail counter satisfies the fail counter threshold, transmission of pilot wireless signals;

receive, based on requesting transmission of the pilot wireless signals, another wireless signal transmitted to the receiver, wherein the other wireless signal is a pilot wireless signal;

determine whether another CRC associated with the other wireless signal is passed; and perform the model modification operation based on determining whether the other CRC associated with the other wireless signal is passed.

11. The management system of claim 1, wherein the one or more processors, to perform the model verification operation, are configured to:

perform a model comparison operation; and one of:

perform, based on performing the model comparison operation, a model reversion operation; or perform, based on performing the model comparison operation, a model update operation.

12. A management system, comprising:

one or more processors configured to:

receive a wireless signal transmitted to a receiver;

determine, based on the wireless signal or a set of decoded bits associated with the wireless signal that were determined using an artificial intelligence (AI) receiver module of the receiver, whether a cyclic redundancy check (CRC) associated with the wireless signal is passed;

perform, based on determining whether the CRC associated with the wireless signal is passed, a model modification operation to update a neural network (NN) of the AI receiver module of the receiver; and perform a model verification operation associated with the NN.

13. The management system of claim 12, wherein the one or more processors are further configured to:

save information associated with the wireless signal in a first data structure;

select, based on determining that a pass counter satisfies a pass counter threshold, a set of one or more entries of the first data structure; and move the set of one or more entries to a second data structure.

14. The management system of claim 12, wherein the one or more processors are further configured to:

determine, based on the wireless signal or a set of fallback decoded bits associated with the wireless signal that are determined using a non-AI receiver module of the receiver, that another CRC associated with the wireless signal is passed; and save, based on determining that the other CRC associated with the wireless signal is passed, information associated with the wireless signal in a data structure.

15. The management system of claim 12, wherein the one or more processors are further configured to:

determine an error rate associated with the wireless signal;

determine, based on the error rate, a confidence value associated with the wireless signal;

generate, based on determining that the confidence value is within a confidence range, one or more artificial pilot wireless signals; and save information associated with each artificial pilot wireless signal, of the one or more artificial pilot wireless signals, in a data structure.

16. The management system of claim 12, wherein the wireless signal is a pilotless wireless signal, and wherein the one or more processors, to perform the model modification operation, are configured to:

request transmission of pilot wireless signals;

receive, based on requesting transmission of the pilot wireless signals, another wireless signal transmitted to the receiver, wherein the other wireless signal is a pilot wireless signal;

determine whether another CRC associated with the other wireless signal is passed; and perform the model modification operation based on determining whether the other CRC associated with the other wireless signal is passed.

17. The management system of claim 12, wherein the one or more processors, to perform the model verification operation, are configured to:

perform a model comparison operation; and one of:

perform, based on performing the model comparison operation, a model reversion operation; or perform, based on performing the model comparison operation, a model update operation.

18. A method, comprising:

receiving a wireless signal transmitted to a receiver, determining, based on the wireless signal or a set of decoded bits associated with the wireless signal that were determined using an artificial intelligence (AI) receiver module of the receiver, whether a cyclic redundancy check (CRC) associated with the wireless signal is passed;

performing, based on determining whether the CRC associated with the wireless signal is passed, at least one of:

a data storage operation associated with the wireless signal, a fallback operation associated with the wireless signal, or an online label recovery operation associated with the wireless signal; and performing, based on determining whether the CRC associated with the wireless signal is passed, a model modification operation to update a neural network (NN) of the AI receiver module of the receiver.

19. The method of claim 18, further comprising:

performing a model verification operation associated with the NN.

20. The method of claim 19, wherein performing the model verification operation comprises one of:

performing a model reversion operation; or performing a model update operation.

* * * * *